United States Patent
Takeda et al.

(10) Patent No.: US 9,267,058 B2
(45) Date of Patent: Feb. 23, 2016

(54) ADHESIVE COMPOSITION AND METHOD FOR MANUFACTURING A LAMINATE USING THE ADHESIVE COMPOSITION

(75) Inventors: Kentarou Takeda, Ibaraki (JP); Miki Okamoto, Ibaraki (JP); Takuya Mori, Ibaraki (JP); Tatsuki Nagatsuka, Ibaraki (JP)

(73) Assignee: NITTO DENKO CORPORATION, Ibaraki-shi (JP)

( * ) Notice: Subject to any disclaimer, the term of this patent is extended or adjusted under 35 U.S.C. 154(b) by 519 days.

(21) Appl. No.: 13/695,516

(22) PCT Filed: Apr. 28, 2011

(86) PCT No.: PCT/JP2011/060365
§ 371 (c)(1),
(2), (4) Date: Jan. 9, 2013

(87) PCT Pub. No.: WO2011/136326
PCT Pub. Date: Nov. 3, 2011

(65) Prior Publication Data
US 2013/0118671 A1    May 16, 2013

Related U.S. Application Data

(63) Continuation-in-part of application No. PCT/JP2010/057647, filed on Apr. 30, 2010.

(51) Int. Cl.
*C09J 4/00* (2006.01)
*C09J 133/02* (2006.01)
(Continued)

(52) U.S. Cl.
CPC .... *C09J 4/00* (2013.01); *C09J 5/00* (2013.01); *C09J 133/02* (2013.01); *C09J 133/20* (2013.01);

(Continued)

(58) Field of Classification Search
CPC ...... C09J 139/04; C09J 133/26; C09J 133/02; C09J 133/20; C09J 137/00; C09J 4/00; C09J 5/00; G02F 1/122528; G02B 5/30
See application file for complete search history.

(56) References Cited

U.S. PATENT DOCUMENTS

2007/0267133 A1* 11/2007 Matano et al. ............. 156/272.2
2008/0252973 A1† 10/2008 Akari (Continued)

FOREIGN PATENT DOCUMENTS

| JP | A-10-333140 | 12/1998 |
| JP | A-2000-026805 | 1/2000 |

(Continued)

OTHER PUBLICATIONS

Aug. 28, 2014 Office Action issued in U.S. Appl. No. 13/695,580.

(Continued)

*Primary Examiner* — Daniel McNally
(74) *Attorney, Agent, or Firm* — Oliff PLC

(57) ABSTRACT

Adhesive composition according to the present invention includes an adhesive base agent consisting of a monomer and a polymerization initiator. Adhesion of the adhesive composition changes to take local maximum value, minimum value and a value greater than the local maximum value along with increase of irradiation amount of the electromagnetic wave or particle beam irradiated to the adhesive composition under a predetermined temperature environment. In a method for manufacturing a laminate according to the present invention allows for easy peeling of adherends and a layer of the adhesive composition when adhesion of the adhesive composition takes the minimum value.

21 Claims, 5 Drawing Sheets

(51) Int. Cl.
   *C09J 133/20* (2006.01)
   *C09J 133/26* (2006.01)
   *C09J 137/00* (2006.01)
   *C09J 139/04* (2006.01)
   *G02F 1/1335* (2006.01)
   *C09J 5/00* (2006.01)

(52) U.S. Cl.
   CPC .............. *C09J 133/26* (2013.01); *C09J 137/00* (2013.01); *C09J 139/04* (2013.01); *G02F 1/133528* (2013.01)

(56) References Cited

U.S. PATENT DOCUMENTS

| | | | | |
|---|---|---|---|---|
| 2011/0003135 A1 * | 1/2011 | Hirao et al. | ............... | 428/313.3 |
| 2013/0118671 A1 | 5/2013 | Takeda et al. | | |

FOREIGN PATENT DOCUMENTS

| | | | |
|---|---|---|---|
| JP | B2-3115116 | | 12/2000 |
| JP | 2001-226641 A | † | 8/2001 |
| JP | A-2001-226641 | | 8/2001 |
| JP | A-2006-316181 | | 11/2006 |
| JP | A-2007-212995 | | 8/2007 |
| JP | A-2008-031214 | | 2/2008 |
| JP | 2008-065160 A | † | 3/2008 |
| JP | 2008065160 A | * | 3/2008 |
| JP | A-2008-065160 | | 3/2008 |
| JP | A-2008-169319 | | 7/2008 |
| JP | A-2008-189838 | | 8/2008 |
| JP | A-2008-287207 | | 11/2008 |
| JP | 2009-173877 A | † | 8/2009 |
| JP | A-2009-173877 | | 8/2009 |
| JP | 2010-008928 A | † | 1/2010 |
| JP | 2010-018722 A | † | 1/2010 |
| JP | A-2010-008928 | | 1/2010 |
| JP | A-2010-018722 | | 1/2010 |
| JP | 2010-026270 A | † | 2/2010 |
| JP | A-2010-026270 | | 2/2010 |
| JP | B1-4796662 | | 10/2011 |
| WO | WO 2006/059780 A1 | | 6/2006 |
| WO | WO 2008/029768 A1 | | 3/2008 |
| WO | WO 2008029768 A1 * | 3/2008 | ................. C09J 4/02 |

OTHER PUBLICATIONS

International Search Report for International Patent Application No. PCT/JP2010/057647 mailed Jul. 20, 2010 (with English-language translation).

International Search Report for International Patent Application No. PCT/JP2011/060365 mailed Jul. 26, 2011 (with English-language translation).

International Preliminary Report on Patentability for International Patent Application No. PCT/JP2010/057647 mailed Jul. 20, 2010 (with English-language translation).

International Preliminary Report on Patentability for International Patent Application No. PCT/JP2011/060365 mailed Jul. 26, 2011 (with English-language translation).

Dec. 24, 2014 Office Action issued in Taiwanese Application No. 100114876.

Jun. 3, 2015 Office Action issued in U.S. Appl. No. 13/695,580.

* cited by examiner
† cited by third party

Fig.3

Light source: High voltage mercury lamp
Luminance: @405nm

| | 7mW | | 14mW | | 21mW | | 25.4mW | | 32.5mW | | 41mW | | 60mW | | 80mW |
|---|---|---|---|---|---|---|---|---|---|---|---|---|---|---|---|
| Irradiation time (sec) | Irradiation time (sec) | Adhesive strength (N/25mm) | Irradiation time (sec) | Adhesive strength (N/25mm) | Irradiation time (sec) | Adhesive strength (N/25mm) | Irradiation time (sec) | Adhesive strength (N/25mm) | Irradiation time (sec) | Adhesive strength (N/25mm) | Irradiation time (sec) | Adhesive strength (N/25mm) | Irradiation time (sec) | Adhesive strength (N/25mm) | Irradiation time (sec) | Adhesive strength (N/25mm) |
| 0 | 0 | 0 | 0 | 0 | 0 | 0 | 0 | 0 | 0 | 0 | 0 | 0 | 0 | 0 | 0 | 0 |
| 1 | 1 | 0.1 | 1 | 2.0 | 1 | 3.2 | 1 | 3.3 | 1 | 5.0 | 1 | 4.7 | 1 | 9.1 | 1 | 25 |
| 3 | 5 | 1.3 | 3 | 9.9 | 3 | 8.3 | 3 | 8.8 | 3 | 8.3 | 2 | 7.5 | 2 | 25 | 2 | 25 |
| 4 | 7 | 1.8 | 4 | 6.7 | 4 | 10 | 4 | 4.1 | 4 | 6.8 | 3 | 5.4 | 3 | 25 | 3 | 25 |
| 5 | 10 | 5.4 | 5 | 6.1 | 5 | 2.9 | 5 | 2.8 | 5 | 3.4 | 4 | 25 | 4 | 25 | 4 | 25 |
| 7 | 15 | 7.8 | 7 | 3.8 | 7 | 2.4 | 7 | 2.4 | 7 | 4.1 | 5 | 25 | 5 | 25 | 5 | 25 |
| 10 | 20 | 9.6 | 10 | 3.9 | 10 | 3.9 | 10 | 25 | 10 | 25 | 7 | 25 | 7 | 25 | 7 | 25 |
| 15 | 30 | 6.9 | 15 | 4.4 | 15 | 1.8 | 15 | 25 | 15 | 25 | 10 | 25 | 10 | 25 | 10 | 25 |
| 20 | 60 | 6.3 | 20 | 25 | 20 | 3 | 20 | 25 | 20 | 25 | 15 | 25 | 15 | 25 | 15 | 25 |
| 30 | — | 6.5 | 30 | — | 30 | 25 | 30 | 25 | 30 | 25 | 20 | 25 | 20 | 25 | 20 | 25 |
| 60 | — | 25 | 60 | — | 60 | 25 | 60 | — | 60 | 25 | 30 | 25 | 30 | 25 | 30 | 25 |

Fig.4

|       | PSA-like state | Easy to peel state | Strong adhesion state |
|-------|----------------|--------------------|-----------------------|
| 20°C  | $5.0 \times 10^7$ | $2.7 \times 10^9$ | $4.0 \times 10^9$ |
| 23°C  | $2.6 \times 10^7$ | $2.7 \times 10^9$ | $4.0 \times 10^9$ |
| 80°C  | $2.8 \times 10^5$ | $3.4 \times 10^8$ | $1.9 \times 10^9$ |

Unit: Pa

Fig.5

| | 1sec | 2sec | 3sec | 5sec | 10sec | 15sec | 20sec | 25sec | 30sec | 45sec | 60sec |
|---|---|---|---|---|---|---|---|---|---|---|---|
| 1.5mW | × | × | × | × | △ | ○ | ○ | ○ | ○ | ◎ | ◎ |
| 4mW | × | × | × | △ | ○ | ○ | ○ | ○ | ◎ | ◎ | ◎ |
| 8mW | × | △ | △ | ○ | ○ | ◎ | ◎ | ◎ | ◎ | ◎ | ◎ |
| 15mW | × | △ | ○ | ◎ | ◎ | ◎ | ◎ | ◎ | ◎ | ◎ | ◎ |
| 25mW | △ | ○ | ○ | ◎ | ◎ | ◎ | ◎ | ◎ | ◎ | ◎ | ◎ |
| 35mW | △ | ○ | ○ | ◎ | ◎ | ◎ | ◎ | ◎ | ◎ | ◎ | ◎ |

×:Fluid state
△:PSA-like state
○: Easy-to-peel state
◎:Strong adhesion state

ADHESIVE COMPOSITION AND METHOD FOR MANUFACTURING A LAMINATE USING THE ADHESIVE COMPOSITION

TECHNICAL FIELD

The present invention relates to adhesive composition and a method for manufacturing a laminate using the adhesive composition. In particular, the present invention relates to adhesive composition and a method for manufacturing a laminate using the adhesive composition, for example used for mutually laminating two adherends, a substrate and a polarizing film, for manufacturing a liquid-crystal display unit, which develops adhesive strength by irradiation of electromagnetic wave or particle beam and allows for preventing misalignment when laminating and for peeling easily where necessary.

A liquid-crystal display unit used for a liquid-crystal television is, in general, what a driving circuit, a printed circuit board for driving and, where necessary, a back-light are mounted on a liquid-crystal panel. The liquid-crystal panel is configured by laminating sheet-like polarizing films to both surfaces of a rectangular liquid-crystal cell which the configuration elements thereof are a liquid-crystal layer, two glass substrates sandwiching the liquid-crystal layer, transparent electrodes and/or a color filter. A hard-coat layer and/or an anti-glare layer may be provided on a surface of a polarizing film which has not been laminated to a liquid-crystal cell of a liquid-crystal panel. A polarizing film is, in general, what a transparent protection film made from tri-acetyl cellulose (TAC) is laminated on both surfaces of a polarizer produced from polyvinyl alcohol (PVA) film. As another form of a polarizing film, it may be manufactured by laminating a protection film only on one of the surfaces of the polarizer and laminating a film having optical compensation such as a phase contrast film on the other surface thereof. On a polarizing film, generally, a surface protection film for protecting the polarizing film, an adhesive layer for laminating the polarizing film and the liquid-crystal cell and a releasable film for protecting the adhesive layer until laminating the polarizing film to the liquid-crystal cell. A laminate in which a polarizing film is provided with a surface protection film, an adhesive layer and a releasable film is called an optical film laminate. A polarizing film is, in general, included in a sheet-like optical film laminate cut out from a web-like optical film laminate such that the size of the sheet corresponds to the size of the liquid-crystal cell.

Generally, a liquid-crystal panel of a liquid-crystal display unit is manufactured by laminating a protection film included in a polarizing film and a glass substrate included in a liquid-crystal cell via an adhesive layer. Adhesive used for laminating the liquid-crystal cell and the polarizing film may be defined as having the following properties.

It is a semi-solid material with high viscosity and low elastic modulus, and adhered to an adherend by pressurizing It is peelable from an adherend even after adhesion State of the adhesive does not change in adhering process.

An adhesive having such properties is one type of adhesives in a broad sense, and is called a pressure-sensitive adhesive (hereinafter, PSA) because it intervenes between two adherends and develops adhesive strength by being pressurized. Herein, an adhesive means a PSA.

A technique for laminating a polarizing film and a liquid-crystal cell using a PSA has the following merits. Since a PSA is highly viscous, it allows for preventing misalignment between the liquid-crystal cell and the polarizing film when laminating. In addition, when it is necessary to correct alignment or lamination, it allows for peeling the polarizing film from the liquid-crystal cell.

On the other hand, the technique for laminating a polarizing film and a liquid-crystal cell using a PSA has the following demerits.

1. Degradation of Brightness Uniformity and View Angle Characteristics

As described in above, a PSA is a semi-solid material with high viscosity and low elastic modulus, and the state thereof does not change during laminating. Thus, it is difficult to control change of the size of the polarizing film in an environment where a size of a polarizing film changes by heating or moisturizing after laminating the polarizing film and a liquid-crystal cell via a PSA layer. If the size of the polarizing film changes, it could cause unevenness in brightness within a surface of a liquid-crystal panel. Unevenness of brightness may be noticeable at peripheries and/or at corners of a display surface of the liquid-crystal panel. In addition, it could cause degradation of view angle characteristics in that a contrast is degraded when the liquid-crystal panel is viewed at an oblique angle. These demerits may be further noticeable along with upsizing of liquid-crystal panels in coming days.

2. Generation of Cracks in a Polarizing Film which a Protection Film is Laminated Only on One of Surfaces Thereof Conventional polarizing film is what protection films are laminated on both surfaces of a polarizer. If the protection film is laminated only on one of the surfaces, it allows for making a polarizing film thinner. Since thin polarizing film allows for reducing materials and thus manufacturing cost, using such thin polarizing films in manufacturing liquid-crystal panels is very advantageous for environmental consideration and cost-effectiveness today when liquid-crystal panels are becoming larger and thinner. However, when a thin polarizing film is laminated with a liquid-crystal cell using a PSA, a change in size of the thin polarizing film due to heating, moisturizing or an abrupt temperature change may cause cracks therein. Because of this, in a present liquid-crystal panel manufacturing technique using a PSA, a thin polarizing film having a protection film laminated only on one of the surfaces of a polarizer has not been put into practical use.

3. Scratches on a Surface of a Polarizing Film

A PSA is a material with low elastic modulus. Thus, when a force is applied to a surface of a polarizing film, the polarizing film itself may be deformed even when a hard coat layer is laminated on the surface thereof because repulsive force of the PSA is weak, and a dent and/or a collapse may be generated on the surface of the polarizing film and/or the hard coat layer. This problem may be particularly serious when using a thin polarizing film which seems to be promising in coming days.

4. Difficulty in Re-Working

When a misalignment of laminating position of a liquid crystal cell and a polarizing film or a trapping of foreign item or air bubble is occurred while laminating the polarizing film and the liquid crystal cell using a PSA, it is necessary to peel the polarizing film from the liquid crystal cell. However, since adhesion between the polarizing film and the liquid crystal cell via a PSA may be strong enough to maintain a liquid crystal panel as a product, a large force is required to actually peel the polarizing film from the liquid crystal cell. But, applying a large force to peel the polarizing film from the liquid crystal cell may adversely affect the liquid crystal cells. And, a part of the polarizing film or the PSA may not be completely peeled and may remain on the liquid crystal cell. In such a case, removing process of the remaining polarizing film is complex.

A part of those demerits of the technique for laminating a polarizing film and a liquid crystal cell using a PSA is considered to be solvable by laminating a polarizing film and a liquid crystal cell using a conventional adhesive in place of a PSA. The technique therefor has been proposed in, for example, the Patent Document 1 and the Patent Document 2.

The technique disclosed in the Patent Document 1 is a method for manufacturing a liquid crystal panel by laminating an optical film and a liquid crystal cell, wherein the optical film is first laminated with a substrate in a weak adhesion state, then is brought to a final adhesion state only when the liquid crystal panel is determined to be defect-free under an inspection. The adhesive used in the technique may be, for example, an acrylic ultraviolet ray-curing adhesive or a heat-curing adhesive. In the technique, ultraviolet ray is irradiated to a degree not to fully cure the adhesive so that it is in a weak adhesion state. When the liquid crystal panel is determined to be defect-free under an inspection, ultraviolet ray is irradiated again so that the optical film is fully bonded with the substrate. If the liquid crystal panel is determined to be defective under the inspection, since the adhesive layer is in a weak adhesion state, the optical film may be easily peeled without adversely affecting the product.

The technique disclosed in the Patent Document 2 is a liquid crystal display device having an ultraviolet ray-curing adhesive layer and a method for manufacturing the same. In the technique, a polarizing film is temporarily bonded with a liquid crystal cell via an ultraviolet ray-curing adhesive, and then the polarizing film is fully bonded to the liquid crystal cell by curing the ultraviolet ray-curing adhesive under a irradiation of ultraviolet ray, after inspecting for misalignment and trapping of foreign item or air bubble. If any abnormality such as misalignment of the polarizing film is found in the inspection, the adhesive is removed from the polarizing film except when the polarizing film itself is defective. The polarizing film which the adhesive is removed therefrom is re-used.

Generally, such conventional adhesive may be defined as a material with the following properties.
- It is originally a fluid with liquidity and low viscosity which allows for sufficient application to enlarge contact area when applied to an adherend, and then adheres to the adherend by curing under light irradiation or heating
- Increase in amount of light irradiation or heating changes the adhesive to a fully cured state from a weak adhesion state
- It is impossible to peel the polarizing film from the liquid crystal cell without cohesion failure of the adherends and/or the adhesive even after the adhesive is fully cured
- State of the adhesive irreversibly changes over an adhesion process (changes from fluid to solid).

An adhesive having such properties may be called an energy sensitive adhesive (hereinafter, ESA) which develops adhesive strength by curing under provided energy such as light or heat, and may be called as an ultraviolet ray-curing adhesive or a heat-curing adhesive depending on a type of provided energy.

PRIOR ART DOCUMENT

The prior art documents referred to in the above and following descriptions are listed below.
Patent Document 1: Japanese Patent: JP3115116B
Patent Document 2: Laid-Open Japanese Patent Application Publication JP10-333140A
Patent Document 3: Laid-Open Japanese Patent Application Publication JP2008-31214A
Patent Document 4: Laid-Open Japanese Patent Application Publication JP2007-212995A
Patent Document 5: Laid-Open Japanese Patent Application Publication JP2006-316181A
Patent Document 6: Laid-Open Japanese Patent Application Publication JP2008-189838A

DISCLOSURE OF THE INVENTION

Problem to be Solved by the Invention

As described in above, a conventional ESA is in fluid state before absorbing energy such as ultraviolet ray for example, and develops adhesive strength for laminating adherends by absorbing the energy to be cured. Thus, for example, in a case where laminating a polarizing film and a liquid crystal cell using a conventional ESA, the polarizing film and the liquid crystal cell may mutually slip before the ESA is cured and the alignment accuracy may be degraded. In addition, adhesive strength of a conventional ESA in fluid state is very weak. Thus, until the ESA is cured after laminating a polarizing film and a liquid crystal cell, the polarizing film may be partially peeled from the liquid crystal cell due to curling caused by contraction stress of the polarizing film. The thinner the polarizing film is, the more noticeable the demerit becomes. Further, the conventional ESA cannot be removed from the adherend once cured. This means that if laminating the polarizing film and the liquid crystal cell is failed, the polarizing film cannot be removed from the liquid crystal cell, and it is impossible or extremely difficult at best to re-use the liquid crystal cell.

The technique disclosed in the Patent Document 1 and the Patent Document 2 is for firstly laminating a polarizing film and a liquid crystal cell via an adhesive layer at a weak adhesion state, inspecting whether or not it is necessary to correct the lamination, and then, laminating them at a strong adhesion state by irradiating ultraviolet ray. The technique disclosed in either Patent Document requires a certain degree of peeling force even at a weak adhesion state when it is necessary to peel the polarizing film from the liquid crystal cell to correct the lamination therebetween, and presents a risk of causing the same problem with the PSA described above. Also, if the polarizing film is peeled from the liquid crystal cell at a weak adhesion state, the ESA at a weak adhesion state may remain on the liquid crystal cell after peeling. Since removal of the remaining ESA from the liquid crystal cell requires a solvent, the work for removal becomes complex and an environmental load therefrom becomes larger.

The present invention aims at providing adhesive composition and a method for manufacturing a laminate using the same, which allows for: preventing misalignment when laminating adherends; strongly bonding of the adherends when a correction of lamination is not required; and easily peeling the adherends without any damage thereto when a correction of lamination is required.

Means to Solve the Problem

The inventors of the present invention have completed the invention based on a finding that adhesive strength between adherends laminated via an adhesive composition and state of the adhesive composition may be controlled by precisely controlling irradiation intensity and irradiation amount of electromagnetic wave or particle beam to the adhesive composition, and temperature environment when the electromagnetic wave or particle beam is irradiated to the adhesive composition.

In a first aspect, the present invention provides adhesive composition which intervenes between at least two adherends and develops adhesive strength for laminating the adherends by irradiating electromagnetic wave or particle beam. The adhesive composition defined by the present invention is at fluid state or a highly viscous fluid state at least when the electromagnetic wave or particle beam has not been irradiated, and the adhesive strength thereof for laminating the adherends is very small. The adhesive strength of the adhesive composition may be increased or reduced by irradiating the electromagnetic wave or particle beam at intensity lower than the critical irradiation intensity defined herein and by extending and/or shortening irradiation time of the electromagnetic wave or particle beam via a layer of an intervening film under a predetermined temperature environment. According to the present invention, by providing the irradiation intensity of the electromagnetic wave or particle beam lower than that conventionally used for curing the ESAs, the adhesive strength between the adherends via the adhesive composition may be arbitrarily controlled.

An adhesive composition according to the present invention comprises adhesive agent consisting of at least one type of monomer and at least one type of polymerization initiator for generating polymerization of the adhesive agent. The adhesive composition according to the present invention may be used for mutually laminating at least two adherends to manufacture a laminate. Adhesive strength of the adhesive composition increases to a local maximum value, then decreases to a local minimum value, and then, increases to a value greater than the local maximum value along with increase in irradiation amount of electromagnetic wave or particle beam, irradiated at intensity lower than critical irradiation intensity defined herein under a predetermined temperature environment. According to the present invention, when laminating the two adherends with the adhesive composition, the adherends may be laminated in a state where positions thereof are not misaligned by increasing the adhesive strength to a value in a range where the local maximum value is the greatest value by irradiating the electromagnetic wave or particle beam with an appropriate intensity for a predetermined time. The state of the adhesive composition at the value is viscoelastic where adhesive strength is developed by pressure.

When it is necessary to peel the two adherends, the adherends may be easily peeled by reducing the adhesive strength to a value within a range where is smaller than the local maximum value and the local minimum value is the smallest value by irradiating the electromagnetic wave or particle beam with an appropriate intensity for a predetermined time. The state of the adhesive composition at the value is cured to a degree where at least one of the at least two adherends and the layer of the adhesive composition may be peeled at an interface therebetween without damaging the adherends. Here, "may be peeled at an interface therebetween without damaging the adherends" includes not only a case where the layer of the adhesive composition and the adherend may be peeled at the interface therebetween without causing cohesion failure of the layer of the adhesive composition and the adherend, but also a case where the adhesive composition and the adherend may be peeled at the interface therebetween at a state where a part of the adhesive composition is remaining on the adherend after being peeled.

Adhesive strength of the adhesive composition according to the present invention decreases to the local minimum value after taking the local maximum value, and then, increases to a value greater than the local maximum value along with increase in irradiation amount of electromagnetic wave or particle beam irradiated at intensity lower than critical irradiation intensity. According to the present invention, the adherends may be laminated without any position misalignment by increasing the adhesive strength to a value in a range where the local maximum value is the greatest value by irradiating the electromagnetic wave or particle beam with an appropriate intensity for a predetermined time under a first predetermined temperature environment. When a correction of the lamination is not required, the two adherends may be bonded at a final strong adhesion by increasing the adhesive strength to a value greater than the local maximum value by further irradiating the electromagnetic wave or particle beam with an appropriate intensity under the first predetermined temperature environment for the predetermined time. The state of the adhesive composition then is cured at the same degree when the adhesive strength is at the local minimum value or is further cured, and if it is attempted to peel the two adherends, cohesion failure may occur in the layer of the adhesive composition and/or within the adherends.

The adhesive composition according to the present invention allows for increasing the adhesive strength to a value greater than the local maximum value by maintaining the adhesive composition under a second predetermined temperature environment higher than the first predetermined temperature environment for a time equal to or longer than the predetermined time, after the adhesive strength decreased to the local minimum value after taking the local maximum value, by irradiating the electromagnetic wave or particle beam under the first predetermined temperature environment. In this case, the adherends may be laminated without position misalignment by increasing the adhesive strength to at least the local maximum value. When a correction of the lamination is not required, the two adherends may be bonded at final strong adhesion by increasing the adhesive strength to a value greater than the local maximum value by maintaining the adherends under the second predetermined temperature environment for a time equal to or longer than the predetermined time. The state of the adhesive composition then is cured at the same degree when the adhesive strength is at the local minimum value or is further cured, and if it is attempted to peel the two adherends, cohesion failure may occur in the layer of the adhesive composition and/or within the adherends.

Adhesive strength of the adhesive composition according to the present invention may be reduced to a value smaller than at least the local maximum value by immersing the adhesive layer in water after the adhesive strength increases to a value greater than the local maximum value along with increase in irradiation amount of electromagnetic wave or particle beam. According to the present invention, when it is necessary to peel the two adherends laminated via the adhesive composition after reaching to the final strong adhesion state, the two adherends and the adhesive composition may be easily peeled by erring the laminate consisting of the two adherends and the adhesive composition in water to swell the adhesive composition.

In the adhesive composition according to the present invention, increase of the irradiation intensity of the electromagnetic wave or particle beam and/or increase of the temperature reduces time necessary for the adhesive strength increasing to the local maximum value, decreasing from the local maximum value to the local minimum value, and increasing to a value greater than the local maximum value from the local minimum value. According to the present invention, appropriate selection of the irradiation intensity of the electromagnetic wave or particle beam and the temperature for bonding allows for arbitrarily controlling time for the adhesive composition reaching to a certain adhesive strength and state and controlling time to maintain the state. Thus, use of the adhesive composition according to the present invention allows for higher degree of freedom in process to laminate the adherends with the adhesive composition.

The at least one type of monomer contained in an adhesive base agent is: preferably a photopolymerizing vinyl monomer having at least one of hydroxyl group, carboxyl group, cyano group, amino group, alicyclic hydrocarbon group, heterocyclic group, isocyanate group, lactone ring group or amido group; preferably an acryloyl group-containing monomer or a photo-polymerizable vinyl monomer having carboxyl group, cyano group, amino group or heterocyclic group; more preferably a (meth)acryloyl group-containing monomer; more preferably a monofunctional (meth)acryloyl group-containing monomer; and more preferably a monofunctional (meth)acryloyl group-containing monomer having a polar group. The polar group is preferably a monofunctional (meth)acryloyl group-containing monomer having at least one of hydroxyl group, carboxyl group, cyano group, amino group, alicyclic hydrocarbon group, heterocyclic group, isocyanate group, lactone ring group or amido group, and the at least one monomer is preferably a hydroxyalkyl (meth)acrylamide, a hydroxyalkyl (meth)acrylate, a N,N-dialkyl (meth)acrylamide, or an N-alkyl (meth)acrylamide.

In one embodiment of the present invention, the polymerization initiator is preferably a photo-polymerization initiator. Absorption wavelength of the photo-polymerization initiator is preferably a wavelength that transmits through either one of the at least two adherends.

It is preferable that the adhesive composition according to the present invention is used as an ESA for laminating an optical film with another optical film or an optical film with a substrate. It is also preferable that the adhesive composition according to the present invention is used as an ESA for manufacturing a liquid crystal display unit, a plasma display unit, and an organic electroluminescence (EL) display unit.

In manufacturing a liquid crystal display unit, one of the two adherends to be laminated may be a polarizer, a protection film laminated on a polarizer for protection thereof or an optical compensation film using a phase contrast film. The other of the two adherends may be a glass substrate or a plastic substrate included in a liquid crystal cell.

In manufacturing a plasma display unit, one of the two adherends to be laminated may be a plasma display panel or a protection substrate thereof, and the other of the two adherends may be a ultraviolet (UV)-cut film, an anti-glare film, an anti-reflection film, an anti-crack film, an electromagnetic wave shield film, a band-pass film or a hard-coat film.

In manufacturing an organic EL display unit, one of the two adherends to be laminated may be an organic EL display panel or a protection substrate thereof, and the other of the two adherends may be a UV-cut film, an anti-glare film, an anti-reflection film, an anti-crack film, a circular polarizing plate for anti-reflection or a hard-coat film.

In a second aspect, the present invention provides a method for manufacturing a laminate including at least two adherends and a layer of adhesive composition by using adhesive composition which intervenes between at least two adherends and develops adhesive strength for mutually laminating the at least two adherends depending on irradiation amount of electromagnetic wave or particle beam. In one embodiment of the present invention, the method for manufacturing a laminate according to the present invention comprises steps of: irradiating the electromagnetic wave or particle beam to change a state of the adhesive composition to a viscoelastic state which develops adhesive strength by pressure to temporarily bond the at least two adherends via the adhesive composition in the viscoelastic state; inspecting the temporarily bonded at least two adherends to determine whether correction of lamination is required; when it is required as a result of the inspection to correct lamination of the temporarily bonded at least two adherends, further irradiating the electromagnetic wave or particle beam so that the adhesive strength is in a predetermined range where the local minimum value is the smallest value in a range smaller than the local maximum value to peel at least one of the at least two adherends and the layer of the adhesive composition at an interface therebetween; and when it is not required as a result of the inspection to correct lamination of the temporarily bonded at least two adherends, further irradiating the electromagnetic wave or particle beam to fully bond the at least two adherends.

According to another embodiment of the present invention, the method for manufacturing a laminate according to the present invention comprises steps of: irradiating electromagnetic wave or particle beam to change a state of adhesive composition to a viscoelastic state which develops adhesive strength by pressure to temporarily bond at least two adherends via the adhesive composition in the viscoelastic state; further irradiating the electromagnetic wave or particle beam to the adhesive composition so that the adhesive strength is in a predetermined range where the local minimum value is the smallest value in a range smaller than the local maximum value to inspect the temporarily bonded at least two adherends to determine whether correction of lamination is required; when it is required as a result of the inspection to correct lamination of the temporarily bonded at least two adherends, further irradiating the electromagnetic wave or particle beam so that the adhesive strength is in a predetermined range where the local minimum value is the smallest value in a range smaller than the local maximum value to peel at least one of the at least two adherends and the layer of the adhesive composition at an interface therebetween; and when it is not required as a result of the inspection to correct lamination of the temporarily bonded at least two adherends, further irradiating the electromagnetic wave or particle beam to fully bond the at least two adherends.

BRIEF DESCRIPTION OF THE DRAWINGS

FIG. 3 is a table showing test result for change of adhesive strength to glass when irradiation amount of electromagnetic wave or particle beam is changed.

FIG. 4 is a table showing elasticity of the adhesive composition according to the present invention at PSA-like state, easy-to-peel state, and strong adhesion state.

FIG. 5 is a table showing change of state of the adhesive composition according to irradiation intensity of the electromagnetic wave or particle beam.

BEST MODE FOR CARRYING OUT THE INVENTION

Figure 1:
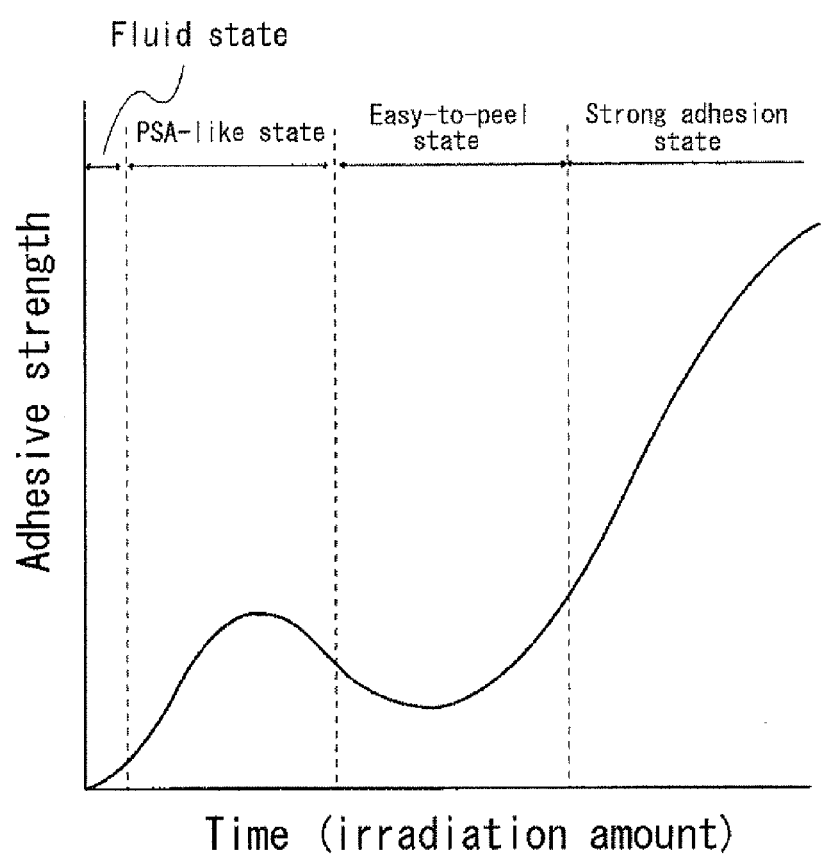
FIG. 1 is a schematic diagram showing change of adhesive strength of the adhesive composition according to the present invention.

The present invention is particularly described in the following.

<Adhesive Base Agent>

The adhesive composition according to the present invention comprises: (a) an adhesive base agent consisting of at least one type of monomer and (b) at least one type of polymerization initiator for initiating polymerization of the adhesive base agent. The at least one type of monomer is a material which becomes a polymer by polymerization under an action of the polymerization initiator. Glass transition temperature of the adhesive base agent, after polymerization, is preferably 50° C. or higher, when the adhesive base agent is used for laminating a polarizing film and a substrate of a liquid crystal panel. Glass transition temperature of 50° C. or higher allows for reducing unevenness of display by reducing deformation of a polarizing film even when heat generates distortion in a liquid crystal panel or the polarizing film in, for example, a liquid crystal display unit. When the adhesive composition according to the present invention is used as an adhesive for panels for vehicles, it also improves durability of the panels under heat because adhesive strength of the adhesive composition may be maintained even when a temperature in a car cabin becomes high.

It is preferable that refraction index of the adhesive base agent after polymerization is close to that of two adherends to be laminated via a layer of the adhesive composition. It is most preferable that the refraction index of the adhesive base agent after polymerization is intermediate of those of the two adherends. Use of the adhesive composition comprising such adhesive base agent allows for improving efficiency of use of light and visibility because reflection at an interface between the layer of the adhesive composition and the adherends is reduced.

The material usable as a monomer for an adhesive base agent for the adhesive composition according to the invention is preferably a photo-polymerizing vinyl monomer having at least one of hydroxyl group, carboxyl group, cyano group, amino group, amido group, carboxylate ester group, alicyclic hydrocarbon group, isocyanate group, lactone ring group or heterocyclic group, and, in particular for bonding a glass substrate and a polarizing film, preferably an acryloyl group-containing monomer or a photopolymerizable vinyl monomer having carboxyl group, cyano group, amino group, amido group, isocyanate group, lactone ring group or heterocyclic group, preferably a (meth)acryloyl group-containing monomer, more preferably a monofunctional (meth)acryloyl group-containing monomer, and more preferably a monofunctional (meth)acryloyl group-containing monomer having a polar group.

The acryloyl group-containing monomer may include a (meth)acrylamide monomer, a (meth)acrylate monomer. It may also include an acryloyl group-containing monomer having a polar group such as isocyanate group, lactone ring group, heterocyclic group, hydroxyl group and amino group.

The acrylamide monomer may include, for example, hydroxymethyl acrylamide, hydroxyethyl acrylamide, hydroxypropyl acrylamide, dimethyl acrylamide, diethyl acrylamide, N-methyl acrylamide and the like. The acrylamide monomer is preferable because: it has a polar group; owing to the polar group, hydrogen bonding capacity to the surface of glass substrate is improved; glass transition temperature is often a room temperature or higher; adhesive strength can be reduced by immersing in water so that it is easily recycled; and adhesive strength can be reduced without using various organic solvents so that environmental load is reduced.

The (meth)acrylate monomer may include a (meth)acrylate monomer having hydroxyl group, heterocyclic group or alicyclic hydrocarbon group.

The (meth)acrylate monomer having hydroxyl group may include, for example, hydroxyethyl acrylate, hydroxyethyl methacrylate, hydroxypropyl acrylate, hydroxypropyl methacrylate, hydroxybutyl acrylate and hydroxybutyl methacrylate. The (meth)acrylate monomer having hydroxyl group is preferable because it has a polar group, and owing to the polar group, hydrogen bonding capacity to the surface of glass substrate is improved.

The (meth)acrylate monomer having heterocyclic group may include, for example, glycidyl methacrylate and tetrahydrofurfuryl methacrylate. The (meth)acrylate monomer having heterocyclic group is preferable because it has a polar group, and owing to the polar group, hydrogen bonding capacity to the surface of glass substrate is improved.

The (meth)acrylate monomer having isocyanate group may include, for example, 2-isocyanatoethyl acrylate and 2-isocyanatoethyl methacrylate. The (meth)acrylate monomer having isocyanate group is preferable because it has a polar group, and owing to the polar group, hydrogen bonding capacity to the surface of glass substrate is improved.

The (meth)acrylate monomer having lactone ring group may include, for example, γ-butyrolactone acrylate and γ-butyrolactone methacrylate monomer. The (meth)acrylate monomer having lactone ring group is preferable because it has a polar group, and owing to the polar group, hydrogen bonding capacity to the surface of glass substrate is improved.

The (meth)acrylate monomer having alicyclic hydrocarbon group may include, for example, dicyclopentenyl acrylate, isobornyl acrylate, and cyclohexyl methacrylate. Since the (meth)acrylate monomer having alicyclic hydrocarbon group has no polar group, it is suitable for laminating with substrates having no polar group or week polarity, such as cycloolefinic substrates.

Other polar group-containing monomer may include, for example, acryloylmorpholine, acrylic acid, acrylamide, and acrylonitrile. The other polar group-containing monomer is preferable because it has a polar group, and owing to the polar group, hydrogen bonding capacity to the surface of glass substrate is improved.

The adhesive base agent of the adhesive composition according to the present invention may be what two or more of the above monomers are combined therein. Also, the adhesive base agent may be what any of the above monomers is a base component and a monomer other than the above monomers is a sub-component. In this case, it is preferable that a ratio of the above monomer in the adhesive base agent is greater than 50%. The adhesive composition according to the present invention is in fluid state when the electromagnetic wave or particle beam has not been irradiated under a predetermined temperature environment for curing the adhesive composition. Herein, the fluid state includes highly viscous fluid state. For the adhesive composition to be in fluid state, the adhesive base agent of the adhesive composition needs to be fluid or dissolved in fluid material under a predetermined temperature environment for curing the adhesive composition.

<Polymerization Initiator>

Any publicly-known polymerization initiator may be used as a polymerization initiator of the adhesive composition according to the present invention. A polymerization initiator is a material that can absorb energy to produce active species. Polymerization of an adhesive base agent is initiated when active species produced by the polymerization initiator is added to unsaturated bond of the adhesive base agent, and proceeds as active species of the adhesive base agent is added to unsaturated bond of the adhesive. It is preferable to use a photo-polymerization initiator as a polymerization initiator in the present invention. Use of a photo-polymerization initiator allows for generating polymerization by light to facilitate control of adhesive strength and state of the adhesive composition according to the present invention and to avoid deterioration or failure of the adhesive. Examples of photo-polymerization initiator may include alkylphenone photo-polymerization initiator, acylphosphine oxide photo-polymerization initiator, titanocene photo-polymerization initiator, and cation photo-polymerization initiator. Examples of photo-polymerization initiator using ultraviolet may include various photo-polymerization initiators such as benzoin photo-polymerization initiator, benzophenon photo-polymerization initiator, anthraquinones photo-polymerization initiator, xanthone photo-polymerization initiator, tioxanthone photo-polymerization initiator, ketal photo-polymerization initiator.

Specific examples of the photo-polymerization initiator may include acetophenone compounds such as 4-(2-hydroxy-ethoxy)phenyl(2-hydroxy-2-propyl)ketone, α-hydroxy-α, α'-dimethyl acetophenone, methoxy acetophenone, 2,2-dimethoxy-2-phenyl acetophenone, 2,2-diethoxy acetophenone, 1-hydroxycyclohexyl phenyl ketone, and 2-methyl-1-[4-(methylthio)-phenyl]-2-morpholinopropane-1-one; benzoin ether compounds such as benzoin ethyl ether, benzoin isopropyl ether, and anisoin methyl ether; α-ketol compounds such as 2-methyl-2-hydroxypropiophenone; ketal compounds such as benzyl dimethyl ketal; aromatic sulfonyl chloride compounds such as 2-naphthalenesulfonyl chloride; photo-active oxime compounds such as 1-phenone-1,1-propanedione-2-(O-ethoxycarbonyl)oxime; benzophenone compounds such as benzophenone, benzoylbenzoic acid, 3,3'-dimethyl-4-methoxy-benzophenone, and 3,3',4,4'-tetra(t-butyl peroxycarbonyl)benzophenone.

Energy necessary for a polymerization initiator to produce active species is generally provided through either one of two adherends to be laminated via the adhesive composition. Thus, when a photo-polymerization initiator is used as a component of the adhesive composition, it is preferable that light absorption wavelength of a usable photo-polymerization initiator is a wavelength that transmits through adherends to be laminated. For example, when the adhesive composition according to the present invention is used for laminating a liquid crystal cell and a polarizing film which a TAC film is used as a protection film thereof, it is preferable to use a photo-polymerization initiator having light absorption at wavelength longer than about 380 nm that transmits through a polarizing film so that irradiated light is not absorbed by light absorber contained in the TAC.

In the present invention, as electromagnetic wave or particle beam for irradiation, it is preferable to use electromagnetic wave having wavelength of ultraviolet ray or that in vicinity thereof. If visible light is used, polymerization may proceed under effect of surrounding light to make control of reaction difficult, and absorption of visible light by residual of the polymerization initiator may color the adhesive composition. If infrared ray is used, polymerization may proceed under effect of heat to make control of reaction difficult.

In the present invention, it is preferable that a photo-polymerization initiator, after reacting by light, has no or low absorption in a range of wavelength of visible light. Particularly, when the adhesive composition according to the present invention is used for a liquid crystal display unit, it is preferable that a photo-polymerization initiator has no or low absorption in vicinity of 440 nm, 530 nm and 610 nm which are the peaks of an emission line of a backlight so that it does not affect hue when viewing.

<Mixing Ratio of Adhesive Base Agent and Polymerization Initiator in the Adhesive Composition>

Mixing ratio of adhesive base agent and polymerization initiator in the adhesive composition according to the present invention is not particularly specified. However, if a ratio of the polymerization initiator is too high, it may raise problems such as reaction control is difficult because speed of polymerization is too fast, the adhesive composition is colored and dispersion of the polymerization initiator is deteriorated. If the ratio of the polymerization initiator is too low, productivity of a process of laminating the adherends using the adhesive composition is reduced and is not preferable. For example, when hydroxyethyl acrylamide (HEAA) is used as an adhesive base agent and acylphosphine oxide photo-polymerizing initiator is used as a polymerization initiator, it is preferable that the adhesive composition according to the present invention contains 0.3 to 3 parts of the polymerization initiator to 100 parts of HEAA in the adhesive composition.

<Change of Adhesive Strength and State of the Adhesive Composition According to Irradiation Intensity of Electromagnetic Wave or Particle Beam>

The adhesive composition according to the present invention may be used for mutually laminating two adherends by intervening therebetween. In the present invention, the adhesive strength between the adherends via the adhesive composition and the state of the adhesive composition according to the present invention may be controlled by controlling temperature environment where the adhesive composition is exposed so that the temperature of the adhesive composition is maintained at a certain degree for a predetermined time, as well as by maintaining irradiation intensity of the electromagnetic wave or particle beam irradiated to the adhesive composition smaller than the irradiation intensity defined herein for curing conventional adhesives.

When mutually laminating at least two adherends using the adhesive composition according to the present invention, electromagnetic wave or particle beam is irradiated from a side of one of the adherends of the laminate consisting of the at least two adherends and the adhesive composition and reaches to the adhesive composition through the one of the adherends. Therefore, the irradiation intensity and the irradiation amount of the electromagnetic wave or particle beam to the laminate (i.e. the irradiation intensity and the irradiation amount of the electromagnetic wave or particle beam measured between the irradiation source and the laminate, hereinafter referred as "measured irradiation intensity and irradiation amount"), and the actual irradiation intensity and the actual irradiation amount of the electromagnetic wave or particle beam to the adhesive composition itself (hereinafter referred as "theoretical irradiation intensity and irradiation amount") are different. Herein, when irradiation intensity and irradiation amount of the electromagnetic wave or ultraviolet is referred, it means the measured irradiation intensity and irradiation amount, not the actual irradiation intensity and irradiation amount. For example, since light transmissivity at wavelength of 400 nm by a polarizing film from Nitta Denko Corporation (product code VEGQ5724DU) is about 30%, light intensity and amount absorbed by the adhesive composition through this polarizing film (the theoretical irradiation intensity and irradiation amount) may be about 30% of the irradiation intensity and the irradiation amount of the light source (the measured irradiation intensity and irradiation amount).

Adhesive strength F for laminating an adherend 1 and an adherend 1' via a layer 2 of the adhesive composition is defined as the smallest of the following f1, f1', f2, f3 and f3':

Interface adhesive strength f1, f1': adhesive strength working between the adherend 1 or the adherend 1' and the layer 2;

Cohesion of the adhesive composition f2: force working between molecules of the adhesive composition within the layer 2;

Cohesion of adherends f3, f3': force working between molecules within the adherend 1 and the adherend 1'.

Relationship of magnitude among the f1, f1', f2, f3 and f3' determines where state of adhesion fails, such as, at an interface between the adherend 1 and the adherend 1', the layer 2, or the adherend 1, 1' and the layer 2. The state of adhesion between the adherend 1 and the adherend 1' fails at where the above forces are the smallest. The failure is classified as cohesion failure of the adherends 1, 1', interface failure between the adherends 1, 1' and the layer 2, cohesion failure of the layer 2 of the adhesive strength composition, and the mixture failure thereof. Generally, since it is difficult to measure adhesive strength, peeling force is evaluated as the adhesive strength. The peeling force takes a value including a force required for plastic deformation of the layer 2 of the adhesive composition and a force smaller of the interface adhesive strength f1, f1'.

Use of the adhesive composition according to the present invention allows for arbitrarily controlling of adhesive strength for mutually laminating adherends (F in the above definition of adhesive strength (hereinafter, the symbol for adhesive strength is that used in the above definition)) and state of the adhesive composition.

(Fluid State)

The layer 2 of the adhesive composition according to the present invention is in fluid state with liquidity when the electromagnetic wave or particle beam has not been irradiated and under at least the first predetermined temperature environment, as for the conventional adhesives according to the above definition. In this state, the adhesive strength F is very small and the lamination position of the two adherends 1, 1' via the layer 2 may be easily displaced. At this point, the cohesion f2 is very small compared with f1, f1', f3 and f3'.

(PSA-Like State)

If the electromagnetic wave or particle beam with an appropriate intensity is irradiated to the layer 2 under the first predetermined temperature environment, the adhesive strength F increases along with the increase of the irradiation amount thereof (i.e. the cohesion f2 becomes larger). If the irradiation amount further increases, the adhesive strength F reaches to the local maximum value and then starts decreasing. The state of the layer 2 when the adhesive strength F takes a value in a predetermined range including the local maximum value is similar to a state of the conventional adhesives according to the above definition (i.e. PSA), that is viscoelastic body which is not fully cured and with high viscosity and low elastic modules. When the layer 2 is at such state, the layer 2 develops adhesive strength by pressure and may reduce misalignment of the two adherends 1, 1' laminated via the layer 2 by preventing displacement between the two adherends 1, 1'. At this point, the cohesion f2 has a sufficient magnitude not to generate any displacement by a force in shearing direction at laminating.

If a peeling force is applied between the two adherends 1, 1' while the adhesive strength F is taking a value in the predetermined range including the local maximum value, the layer 2 deforms to stretch, and when the peeling forces becomes larger than a force that is a sum of the interface adhesive strength f1 or f1' and a force required for the layer 2 to deform to stretch (a force required for plastic deformation of the layer 2 at the state of viscoelastic body), one of the adherends 1 and 1' is peeled from the layer 2. Whether the one of the adherends 1 and 1' is peeled from the layer 2 at the interface between the adherend 1 and the layer 2 or at the interface between the adherend 1' and the layer 2 depends on the magnitude of f1 and f1'. In the above, since the f2 is greater than the f1 or f1', cohesion failure of the adhesive may be prevented. If the one of the adherends 1 and 1' is peeled from the layer 2, since the layer is at the similar state as PSA according to the above definition, they may be re-bonded.

As described above, the state of the adhesive composition when it changes to a viscoelastic body which develops the adhesive strength F by pressure is herein referred as "PSA-like" state. The adhesive composition shows the PSA-like state when the adhesive strength F takes a value in a predetermined range where the local maximum value is the greatest value. The local maximum value of the adhesive strength F and the predetermined range including the local maximum value when the adhesive composition is in the PSA-like state vary depending on conditions including a type of the adhesive base agent, a type and a dose of the photo-polymerization initiator, irradiation intensity and wavelength of the electromagnetic wave or particle beam, and temperature environment. Proportion of reacted monomer of the adhesive base agent when the adhesive strength F is at the local maximum value (hereinafter, "proportion A of reacted monomer") is from 20 to 70%, and preferably is from 30 to 65%.

After the adhesive composition reaching to the PSA-like state, the state may be maintained for a certain period by shading the adhesive composition from further irradiation of the electromagnetic wave or particle beam and by maintaining the temperature lower than the first predetermined temperature environment.

For example, a case where one of the at least two adherends, the adherend 1, is a polarizing film and the other, the adherend 1', is a glass of a liquid cell is considered. The polarizing film is a laminate which protection films consisting TAC are laminated on both surfaces thereof. Although the detail of experiments will be later described in Example 1, the layer 2 came to "PSA-like" state when: an adhesive composition containing 100 parts of HEAA monomer and 1 part of acylphosphine oxide photo-polymerizing initiator was applied on a glass to form the layer 2; a polarizing film was laminated on the layer 2; and, while the obtained laminate was heated at 70° C. from the glass side, light with energy of 15 to 35 mJ/cm$^2$ with the wavelength of 405 nm was irradiated from the polarizing film side at the irradiation intensity of 7 mW/cm$^2$. The local maximum value of the adhesive strength was 12N/25 mm. And the proportion of the reacted monomer when the adhesive strength was at the local maximum value was about 57%.

(Easy-to-Peel State)

After the adhesive strength F reached to the local maximum value, if the electromagnetic wave or particle beam with an appropriate intensity is further irradiated to the layer 2 under the first predetermined temperature environment, the adhesive strength F decreases to the local minimum value along with the increase of the electromagnetic wave or particle beam and then starts to increase again. The state of the layer 2, when the adhesive strength F takes a value in a predetermined range including the local minimum value, is not fully cured, though the layer 2 is further cured than it was at the PSA-like state. While the layer 2 is in such state, the two adherends 1, 1' may be easily peeled from the layer 2 with a little force. Thus, the laminated two adherends 1, 1' may be peeled without giving damage thereto. At this point, the cohesion f2 is larger than when the layer 2 was at the PSA-like state and either of the interface adhesive strength f1 or f1' is considered to be far smaller than the f2. Since the layer 2 is cured, the adhesive strength F is very small and the adhesive composition hardly spreads onto the adherends, and thus, once the adherend 1 or 1' is peeled from the layer 2, it is not possible to re-bond them with adhesive strength sufficient to maintain at least the state of lamination as a product.

As described in the above, the state of cure when at least one of the adherends 1, 1' and the layer 2 may be peeled at the interface therebetween without damaging the adherends is herein referred as "easy-to-peel" state. The adhesive composition shows the easy-to-peel state when the adhesive strength F takes a value in a predetermined range where the local minimum value is the smallest value. The local minimum value of the adhesive strength F and the predetermined range including the local minimum value when the adhesive composition is in the easy-to-peel state vary depending on conditions including a type of the adhesive base agent, a type and a dose of the photo-polymerization initiator, irradiation intensity and wavelength of the electromagnetic wave or particle beam, and temperature environment. Proportion of reacted monomer of the adhesive base agent when the adhesive strength F is at the local minimum value (hereinafter, "proportion B of reacted monomer") is from 65 to 95%, and preferably is from 70 to 90%. The relationship between the proportion A of the reacted monomer and the proportion B of the reacted monomer satisfies the following equation.

Proportion $A$ of the reacted monomer<Proportion $B$ of the reacted monomer

Also, elastic modulus when the adhesive strength is at the local minimum value is significantly, about 10 times or more, larger than that when the adhesive strength is at the local maximum value.

In the same Example 1, for example, when light having energy of 35 to 150 mJ/cm$^2$ was irradiated from the polarizing film side, the state of the layer 2 changed to the "easy-to-peel" state, and the local minimum value of the adhesive strength then was 0.5N/25 mm, and the proportion of the reacted monomer when the adhesive strength was at the local minimum value was about 87%.

(Strong Adhesion State)

After the adhesive strength F started increasing again after taking the local minimum value, if the electromagnetic wave or particle beam with an appropriate intensity is continued to be irradiated to the layer 2 under the first predetermined temperature environment, the adhesive strength F increases along with the increase of the irradiation amount of the electromagnetic wave or particle beam and finally reaches to a value at least greater than the local maximum value. At this point, the polymerization of the adhesive base agent in the layer 2 is almost completed and the layer 2 is at a same cured state as it was at the easy-to-peel state or is further cured, and thus the two adherends 1, 1' strongly adhere via the layer 2. The cohesion f2 at this point is same as or greater than the f2 at the easy-to-peel state, and the interface adhesive strength f1 and f1' are greater than the f2 in the PSA-like state. Already at this point, the two adherends 1, 1' may not be peeled, and if they are forced to be peeled, cohesion failure occurs in either of the adherend 1 or the adherend 1' or the layer 2 depending on the magnitude relationship between the f2, f3 and f3'.

As described in above, the state of the adhesive composition when it is at a same cured state as it was at the easy-to-peel state or is further cured is herein referred as "strong adhesion" state. The adhesive composition shows the strong adhesion state when the adhesive strength F takes a value greater than the local maximum value. The smallest value of the adhesive strength F when the adhesive composition is in the strong adhesion state (i.e. the local minimum value in a range greater than the local maximum value) varies depending on conditions including a type of the adhesive base agent, a type and a dose of the photo-polymerization initiator, irradiation intensity and wavelength of the electromagnetic wave or particle beam, and temperature environment. Proportion of reacted monomer of the adhesive base agent when the adhesive strength F is at a value greater than the local maximum value (hereinafter, "proportion C of reacted monomer") is from 80 to 100%, and preferably is from 85 to 100%. The relationship between the proportion C, the proportion A of the reacted monomer and the proportion B of the reacted monomer satisfies the following equation.

Proportion $A$ of the reacted monomer<Proportion $B$ of the reacted monomer≤Proportion $C$ of the reacted monomer Also, elastic modulus when the adhesive strength is at a value greater than the local maximum value is substantially equal to or larger than that when the adhesive strength is at the local minimum value, which is about 10 time more larger than elastic modulus when the adhesive strength is at the local maximum value.

In the same Example 1, for example, when light having energy greater than 150 mJ/cm$^2$ was irradiated from the polarizing film side, the layer 2 changed to the "strong adhesion" state. The maximum value of the adhesive strength then was greater than the cohesion of the protection film included in the polarizing film and the interface adhesive strength between the protection film and the polarizer. And the proportion of the reacted monomer when the irradiation amount was at 300 mJ/cm$^2$ was about 89%.

(Summary on Change of Adhesive Strength and State of the Adhesive Composition)

As described in above, when the electromagnetic ware or particle beam is irradiated at intensity lower than that used for the conventional adhesive composition under a predetermined temperature environment, the value of the adhesive strength F of the adhesive composition according to the present invention changes as shown in FIG. 1 along with the increase of the irradiation amount of the electromagnetic ware or particle beam. It is possible to increase the adhesive strength F to the local maximum value, then to decrease to the local minimum value, and then, to increase again to a value greater than the local maximum value along with the increase in the irradiation amount of the electromagnetic wave or particle beam. The state of the adhesive composition when the adhesive strength F takes a value in the predetermined range including the local maximum value is the above described PSA-like state, the state thereof when it takes a value in the predetermined range including the local minimum value is the easy-to-peel state, and the state thereof when it takes a value greater than the local maximum value is the strong adhesion state. When the adhesive composition is in the easy-to-peel state, it has almost cured and has sufficient cohesion but has not reached to the strong adhesion state, and thus, the adhesive composition may be easily peeled from the adherend at the interface therebetween with a small force.

Figure 2:
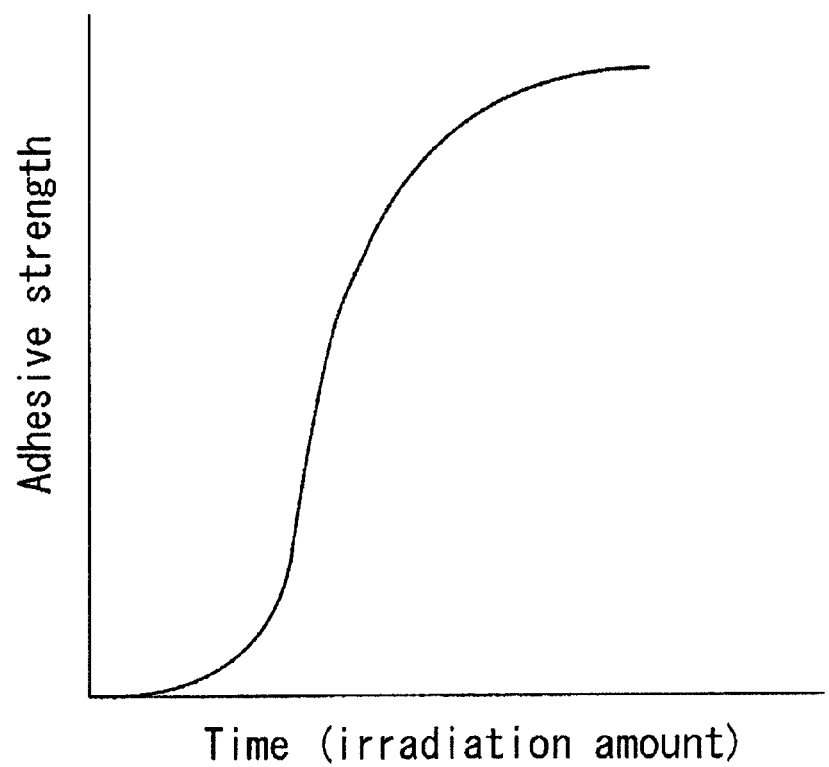
FIG. 2 is a schematic diagram showing change of adhesive strength of conventional adhesive composition.

On the other hand, a value of adhesive strength F of the conventional adhesive composition increases along with the increase of the electromagnetic wave or particle beam without taking a local maximum value or a local minimum value, as shown in FIG. 2. This means that the state of the conventional adhesive composition changes from the PSA-like state directly to the strong adhesion state along with the increase of the irradiation amount of the electromagnetic wave or particle beam, and does not pass the easy-to-peel state where the adhesive strength increases to the local maximum value, then decreases to allow for easy peeling of the adherends.

(Critical Irradiation Intensity)

Irradiation intensity of the electromagnetic wave or particle beam for changing the adhesive strength and the state of the adhesive composition according to the present invention as shown in FIG. 1 is far smaller than intensity used for changing the adhesive strength of the conventional adhesive composition as shown in FIG. 2. Herein, the greatest value of the irradiation intensity of the electromagnetic wave or particle beam for changing the adhesive strength F of the adhesive composition according to the present invention as shown in FIG. 1 is referred as "critical irradiation intensity." When the electromagnetic wave or particle beam with intensity greater than the critical irradiation intensity is irradiated, the adhesive strength F of the adhesive composition changes as shown in FIG. 2 without taking the local maximum value and the local minimum value.

For example, although the detail of experiments will be later described in Example 2, when the electromagnetic wave or particle beam with intensity greater than 41 mW/cm$^2$ at wavelength of 405 nm was irradiated to the adhesive composition consisting of 100 parts of HEAA and 0.5 part of a photo-polymerization initiator, the adhesive strength of the adhesive composition increased without taking a local maximum or a local minimum value along with the increase of the irradiation amount, and the state thereof changed from the PSA-like state directly to the strong adhesion state without being the easy-to-peel state. On the other hand, when the electromagnetic wave or particle beam with intensity of 41 mW/cm$^2$ or less was irradiated to the same adhesive composition, the adhesive strength increased with taking the local maximum and the local minimum values along with the increase of the irradiation amount, and the state thereof changed from the PSA-like state to the strong adhesion state via the easy-to-peel state. As described, the critical irradiation intensity then was 41 mW/cm$^2$ (refer to FIG. 3). In the above example, since the light was irradiated through the polarizing film (VEGQ5724DU from Nitto Denko Corporation), the light actually reached to the adhesive composition was considered to be about 30% of the irradiation intensity. The critical irradiation intensity varies depending on conditions including a type of the adhesive base agent, a type and a dose of the photo-polymerization initiator, temperature environment, and wavelength of the irradiated light.

(Elastic Modulus)

FIG. 4 shows elastic modulus for the adhesive composition according to the present invention when it is in the PSA-like state, the easy-to-peel state and the strong adhesion state. The values of elastic modulus shown in FIG. 4 are those when the electromagnetic wave or particle beam was irradiated with the method shown in Example 1, and the method and the conditions of measurement of the elastic modulus are as shown in Example 1. Elastic modulus of the above-defined conventional adhesive composition (i.e. the PSA) has been described in the patent documents such as the Patent Document 3, the Patent Document 4, the Patent Document 5, and the Patent Document 6. The method and the conditions of measurement of the elastic modulus are different between the adhesive composition according to the present invention and the conventional PSAs according to the above described Patent Documents. The elastic modulus of the adhesive composition according to the present invention is tensile elastic modulus measured with the method of the later-described Example 1. Since the elastic modulus of the conventional PSAs according to the above described Patent Documents is too low to measure by applying tensile stress to a sample in a form of a sheet, stored elastic modulus is measured by applying twisted shear stress. Although the elastic modulus of the adhesive composition according to the present invention should not be directly compared with that of the conventional PSAs, it is in general possible to convert as tensile elastic modulus/3=shear elastic modulus. If numbers of digits of the elastic modulus are different therebetween, it is considered as possible to understand the difference of the elastic modulus as a clear difference of physical properties.

When the elastic modulus of the adhesive composition according to the present invention is compared with that of the conventional PSAs according to the Patent Documents from the above standpoint, it is understood as that the physical properties of the adhesive composition according to the present invention are totally different from those of the conventional PSAs. Since the elastic modulus of the adhesive composition according to the present invention is higher than that of the conventional PSAs, when a polarizing film having a protection film laminated only on one of surfaces of a polarizer is laminated with a liquid crystal cell via the adhesive composition according to the present invention, expansion and shrinkage of the polarizer under heating and cooling in a reliability test (heat-shock test) may be prevented to provide the polarizer with an excellent durability with anti-crack property. On the other hand, since the elastic modulus of the conventional PSAs is low, expansion and shrinkage of the polarizer under heating and cooling in the reliability test may not be prevented so that cracking occurs in the polarizer.

In addition, since the elastic modulus of the conventional PSAs is low, repulsion thereof is small. Therefore, when the conventional PSA is used for laminating the polarizing film and the liquid crystal cell, application of force to a surface of the polarizing film may deform the polarizing film itself to cause dent or collapse on the surface thereof even if the polarizing film has a hard-coat layer. On the contrary, since the elastic modulus of the adhesive composition according to the present invention is high, repulsion thereof is large. Therefore, when the adhesive composition according to the present invention is used for laminating the polarizing film and the liquid crystal cell, application of force to a surface of the polarizing film does not deform the polarizing film itself, and dent or collapse on the surface thereof may be prevented.

When durability of a polarizing film is considered, it is preferable that glass transition temperature Tg of the adhesive composition is high. High Tg of the adhesive composition raises fusing temperature and deforming temperature of the adhesive composition to allow for preventing expanding or shrinking of a polarizer to avoid cracking thereof.

(Control of Adhesive Strength and State by Irradiation Intensity of Electromagnetic Wave or Particle Beam)

Irradiation amount of electromagnetic wave or particle beam may be expressed as product of intensity and time of irradiation. Thus, the adhesive strength and state of the adhesive composition according to the present invention may be arbitrarily changed by controlling irradiation intensity of the electromagnetic wave or particle beam. Thus, when the irradiation intensity of the electromagnetic wave or particle beam is raised within a range lower than the above defined critical irradiation intensity, it allows for shortening time required for the adhesive strength reaching to the local maximum value (or, time for the state of the adhesive composition changing to the PSA-like state), time required for the adhesive strength decreasing from the local maximum value to the local minimum value (or, time for the state of the adhesive composition changing to the easy-to-peel state) and time required for the adhesive strength increasing from the local minimum value to the greatest value (or, time for the state of the adhesive composition changing to the strong adhesion state). For example, by doubling the irradiation intensity of the electromagnetic wave or particle beam, the adhesive strength may be changed, within time half of that before raising the irradiation intensity, from the local maximum value (the state of the adhesive composition at this point is the PSA-like state) to the local minimum value (the state of the adhesive composition at this point is the easy-to-peel state) and then to the greatest value (the state of the adhesive composition at this point is the strong adhesion state). FIG. 5 in the later described Example 3 shows this phenomenon.

However, even with irradiation intensity lower than the above mentioned critical irradiation intensity, the reaction proceeds faster along with the increase of the irradiation intensity of the electromagnetic wave or particle beam to make the control of the local maximum and the local minimum values of the adhesive strength difficult. Particularly, there rises an issue that freedom for stopping the reaction at the PSA-like state after the adhesive strength taking the local maximum value may be reduced. On the other hand, even with irradiation intensity lower than the above mentioned critical irradiation intensity, the reaction proceeds slower as the decrease of the irradiation intensity of the electromagnetic wave or particle beam to result in reduction of productivity. Therefore, practically, it is necessary to select irradiation intensity of the electromagnetic wave or particle beam that satisfies both of facilitating the control of the polymerization reaction and maximizing the productivity.

In addition, for example, when the electromagnetic wave or particle beam is irradiated until the state of the adhesive composition changes to the PSA-like state (or, until the adhesive strength takes a value in a predetermined range where the local maximum value is the greatest value) and then stopped, the adhesive composition may stay in the PSA-like state. Then, by restarting the irradiation of the electromagnetic wave or particle beam, the state of the adhesive composition may be changed to the easy-to-peel state and then to the strong adhesion state. As such, the adhesive composition may maintain the adhesive strength and the state at when the irradiation of the electromagnetic wave or particle beam is stopped. Therefore, by irradiating the electromagnetic wave or particle beam to the adhesive composition applied to the adherends at an appropriate intensity for an appropriate time, the state of the adhesive composition may be changed to the PSA-like state, the adhesive composition may be stored in the state, and, a process of irradiating again the electromagnetic wave or particle beam may be adopted for adhering another adherend to the adhesive composition at a certain point of time later, to allow for structuring a manufacturing process with high degree of freedom.

When the adhesive composition is applied to an adherend and stored in the PSA-like state, the layer of the adhesive composition may be formed on sheets of polarizing film, on a web of polarizing film to be wound or on a substrate for storing. For transferring to the adherend, the layer of the PSA-like adhesive composition may be formed on sheets of releasable liners and stored as sheets, or the layer of the PSA-like adhesive composition may be formed on a web of releasable sheets and wound the web for storing.

(Control of Reaction Speed by Temperature Environment)

As described in above, the adhesive strength and the state of the adhesive composition according to the present invention may be changed depending on the irradiation amount of the electromagnetic wave or particle beam irradiated at intensity lower than the critical irradiation intensity under a predetermined temperature environment. Speed of the change of the adhesive strength and the state may be accelerated by changing the temperature environment where the adhesive composition is placed. That is, raising the temperature of the adhesive composition while the polymerization thereof proceeds under irradiation of the electromagnetic wave or particle beam allows for shortening time required for the adhesive strength reaching to the local maximum value, time required for the adhesive strength decreasing from the local maximum value to the local minimum value and time required for the adhesive strength increasing from the local minimum value to the greatest value.

However, as for controlling the adhesive strength by the irradiation intensity, if the speed of the reaction is too fast, the control of the local maximum and the local minimum value may be difficult, and if the speed of the reaction is too slow, the productivity may be reduced. Also, if the temperature for laminating is too high, films or display units may be destructed. Therefore, practically, it is necessary to select temperature environment that satisfies both of facilitating the control of the polymerization reaction and maximizing the productivity.

The predetermined temperature environment according to the present invention is referred as a temperature environment where calorie calculated as dissipated calorie from the adhesive composition deducted from a sum of calorie provided to the adhesive composition and calorie generated by the polymerization thereof is maintained at a predetermined calorie or higher at least for a predetermined time. Therefore, when it is referred as "under a predetermined temperature environment", it means that the adhesive composition is placed in an environment where it may be heated at a predetermined temperature for a certain period of time, which the heating temperature and the heating environment thereof are considered. For example, when a laminate which two adherends are laminated therein via the adhesive composition is heated in an open system which has dissipation of heat, the laminate requires to be heated at a higher temperature for a certain period of time than in a closed system which does not have dissipation of heat, in order to provide for the adhesive strength to change while taking the local maximum and the local minimum values. The temperature of the adhesive composition when placed under the predetermined temperature environment is required to be in vicinity of or higher than the glass transition temperature of the adhesive composition.

(Control of Adhesive Strength and State by Temperature Environment)

As described in above, the adhesive strength and the state of the adhesive composition according to the present invention may be changed depending on the irradiation amount of the electromagnetic wave or particle beam irradiated at intensity lower than the critical irradiation intensity under a predetermined temperature environment. That is, the adhesive strength of the adhesive composition according to the present invention changes to the local maximum value, then to the local minimum value and then to a value greater than the local maximum value along with the increase of the irradiation amount of the electromagnetic wave or particle beam irradiated thereto under the predetermined temperature environment.

On the other hand, the adhesive strength and state of the adhesive composition may be changed by changing the temperature environment where the adhesive composition is placed at halfway of reaction without irradiating the electromagnetic wave or particle beam. For example, the adhesive strength may be increased from the local minimum value to a value greater than the local maximum value by maintaining the adhesive composition under the second temperature environment for a certain period of time or longer, which the temperature thereof is higher than that of the first temperature environment, after the adhesive strength of the adhesive composition taking the local minimum value after taking the local maximum value by the irradiation of the electromagnetic wave or particle beam under the first temperature environment. Or, the adhesive strength may be increased from the local maximum value directly to a value greater than the local maximum value by maintaining the adhesive composition under the second temperature environment for a certain period of time or longer, which the temperature thereof is higher than that of the first temperature environment, after the adhesive strength of the adhesive composition taking the local maximum value by the irradiation of the electromagnetic wave or particle beam under the first temperature environment. In either case, the temperature of the adhesive composition is required to be in vicinity of or higher than the glass transition temperature of the adhesive composition.

In the present invention, the temperature of the second temperature environment needs to be higher than that of the first temperature environment. That is, when the adhesive strength of the adhesive composition is at the local minimum value (the easy-to-peel state), curing thereof is almost completed and the curing does not much proceed even if the electromagnetic wave or particle beam is further irradiated thereto. However, raising the temperature of the adhesive composition to the glass transition temperature or higher thereof allows for reducing stress at the interface between the adherends and the adhesive composition to improve the adhesive strength. Thus, in order to raise the temperature of the adhesive composition in a state where the electromagnetic wave or particle beam is not irradiated, i.e. without influence of heat generated by the adhesive composition absorbing the electromagnetic wave or particle beam or of irradiation heat, it is necessary to raise the temperature of a temperature environment higher than that of the temperature environment where the electromagnetic wave or particle beam was irradiated.

<Recyclability>

It is required to crush glass of a liquid crystal panel and to collect used rare metal when disposing a liquid crystal display unit. Optical films such as a polarizing film laminated to the liquid crystal panel may be an obstacle when disposing a liquid crystal display unit and should be peeled therefrom. It is preferable to remove optical films such as a polarizing film to reduce weight when recycling. But, when a PSA is used to laminate optical films such as a polarizing film to a liquid crystal cell, adhesive strength thereof increases along with time. Thus, at a time to dispose a liquid crystal panel, the adhesive strength of the PSA is too large so that the laminated optical films are prone to break and peeling thereof is very difficult. In addition, along with upsizing of liquid crystal panels, force necessary to peel optical films from liquid crystal cells becomes larger, but, glasses are thinner and prone to break when peeling, which makes peeling more difficult. The adhesive composition according to the present invention allows for solving such problem in recycling because the adhesive strength thereof is significantly reduced only by immersing in water even after the adhesive strength reaching to the strong adhesion state.

As described in above, once the adhesive strength reaches to the strong adhesion state along with the increase of the irradiation amount of the electromagnetic wave or particle beam irradiated to the adhesive composition at intensity lower than the critical irradiation intensity under the predetermined temperature environment, the adhesive composition may not be peeled from the adherends at the interface therebetween, and if they are forced to be peeled, cohesion failure occurs within the adhesive composition or the adherends. However, immersion of the adhesive composition according to the present invention in water swells itself to reduce either of the interface adhesive strength f1, f1' or the cohesion f2 of the adhesive composition so that the adhesive strength F thereof is reduced to facilitate peeling at the interface between the adherends and the adhesive composition. The adhesive strength F at this point is at least greater than the local maximum value described above. By making the adherends and the adhesive composition peelable, the adhesive composition may be easily peeled from the liquid crystal cell when recycling the liquid crystal television to reduce environmental load and recycling cost. Temperature of water for immersing the adhesive composition to swell to peel is not questioned, but the higher the temperature of water for immersing, the shorter the time to reduce the adhesive strength for making the adhesive composition peelable.

(Other Additives which can be Added)

The adhesive composition according to the present invention may contain additives other than the adhesive base agent and the polymerization initiator, as described in the following. For example, various Si coupling agents or cross-linking agents may be added to the adhesive composition according to the present invention to improve adhesive strength between a substrate of a liquid crystal cell and a polarizing film. Also, a polymerization inhibitor may be added to the adhesive composition from a view point of preventing dark reaction or prolonging usable life. Further, the effect of the present invention may be achieved even when a polymerization initiator having light absorption wavelength different from the transmitting wavelength of the polarizing film is used by adding a photo-sensitizer adjusted to the transmitting wavelength of the polarizing film to the adhesive composition according to the present invention. Also, electric conductive material for providing conductivity, fine particles having birefringence for providing phase difference, or surfactant for improving leveling property of a surface may be added to the adhesive composition. Various curing agent may also be added to the adhesive composition. Curing agents may include phenolic plastic, various imidazole compounds and their derivatives, hydrazide compound, dicyandiamide, isocyanate compound and microencapsulation thereof. For example, when phenolic plastic is added as a curing agent, phosphorous compound such as triphenylphosphin may be combined as a curing accelerator.

<Method for Manufacturing a Laminate According to the Present Invention>

The adhesive composition according to the present invention may be used for manufacturing a laminate including at least two adherends and a layer of adhesive compound by laminating the at least two adherends. The two adherends may be two optical films or an optical film and a substrate. It is preferable that the adhesive composition according to the present invention may be used as an adhesive for manufacturing a liquid crystal display unit, a plasma display unit and/or an organic EL display unit.

In manufacturing a liquid crystal display unit, one of the two adherends to be laminated may be a polarizer, a protection film laminated on a surface of the polarizer for protection thereof and/or an optical compensating film using a phase difference film. The other of the two adherends may be a glass substrate or a plastic substrate included in a liquid crystal cell.

In manufacturing a plasma display unit, one of the two adherends to be laminated may be a plasma display panel and/or a protection substrate thereof, and the other of the two adherends may be a UV-cut film, an anti-glare film, an anti-reflection film, an anti-crack film, an electromagnetic wave shield film, a band-pass film or a hard-coat film.

In manufacturing an organic EL display unit, one of the two adherends to be laminated may be an organic EL display panel or a protection substrate thereof, and the other of the two adherends may be a UV-cut film, an anti-glare film, an anti-reflection film, an anti-crack film, a circular polarizing plate for anti-reflection or a hard-coat film.

As described in above, the adhesive strength of the adhesive composition according to the present invention for laminating two adherends via the adhesive composition may be arbitrarily controlled by irradiating electromagnetic wave or particle beam with intensity lower than the critical irradiation intensity defined herein under a predetermined temperature environment. According to the present invention, the adhesive strength of the adhesive composition may be controlled as the adhesive strength takes to the local maximum value along with the increase of the irradiation amount thereto, then takes the local minimum value along with the further irradiation of the irradiation amount that reduces the adhesive strength, and then takes a value greater than the local maximum value by further increasing the irradiation amount. Thus, in one embodiment of the present invention, using the adhesive composition according to the present invention allows for achieving a method for manufacturing a laminate, wherein, the adherends are mutually laminated after the state of the adhesive composition changes to the PSA-like state or the adherends are mutually laminated while the state of the adhesive composition is changing to the PSA-like state, the lamination is inspected after the state of the adhesive composition changes to the easy to peel state, and if it is not required to correct lamination, the adherends are fully bonded by changing the state of the adhesive composition to the strong adhesion state, and if it is required to correct the lamination, the adhesive composition is maintained in the easy-to-peel state to allow for easy peeling of the adhesive composition and the adherends at the interface therebetween.

In another embodiment of the present invention, using the adhesive composition according to the present invention allows for achieving a method for manufacturing a laminate, wherein, the adherends are mutually laminated after the state of the adhesive composition changes to the PSA-like state or the adherends are mutually laminated while the state of the adhesive composition is changing to the PSA-like state, the lamination is inspected after the state of the adhesive composition changes to the easy to peel state, and if it is not required to correct lamination, the adherends are fully bonded by changing the state of the adhesive composition to the strong adhesion state, and if it is required to correct the lamination, the adhesive composition is maintained in the easy-to-peel state to allow for easy peeling of the adhesive composition and the adherends at the interface therebetween.

Also, by changing at halfway the temperature environment where the adhesive composition according to the present invention is placed, the adhesive and the state thereof may be changed without irradiating the electromagnetic wave or particle beam. Thus, for example, the lamination is inspected after mutually laminating the adherends with the adhesive composition in the PSA-like state under the first temperature environment, and if the correction of the lamination is not required, the adherends may be fully bonded with the adhesive composition in the strong adhesion state by maintaining the adhesive composition under the second temperature environment for a predetermined time period or longer.

The method for manufacturing a laminate according to the present invention may be what includes, in particular, the following steps. Firstly, the electromagnetic wave or particle beam with intensity lower than the critical irradiation intensity defined herein is irradiated under a predetermined temperature environment. By increasing the irradiation amount, the state of the adhesive composition changes to the PSA-like state which develops adhesive strength by pressure. The adhesive strength at this point takes a value within a predetermined range including the local maximum value. Two adherends are mutually temporality bonded by pressure with the adhesive composition in the PSA-like state intervening therebetween. When bonding, the order of the step of irradiating the electromagnetic wave or particle beam to the adhesive composition to change the state thereof to the PSA-like state and the step of laminating the at least two adherends and the adhesive composition is not questioned. For example, the state of the adhesive composition may be changed to the PSA-like state by irradiating the electromagnetic wave or particle beam after applying the adhesive composition to which the electromagnetic wave or particle beam is not yet irradiated (i.e. the adhesive composition in fluid state) to one of the at least two adherends and laminating the other adherend on the adhesive composition. Or, the other adherend may be laminated onto the adhesive composition in the PSA-like state and bonded thereto after applying the adhesive composition to which the electromagnetic wave or particle beam is not yet irradiated (i.e. the adhesive composition in fluid state) to one of the at least two adherends and then irradiating the electromagnetic wave or particle beam thereto.

In bonding, the method and order of the step of applying the adhesive composition to the adherends and the step of irradiating the electromagnetic wave or particle beam to the adhesive composition to change the state thereof to the PSA-like state is not questioned. For example, the adhesive composition may be transferred to one of the at least two adherends after applying the adhesive composition to which the electromagnetic wave or particle beam is not yet irradiated onto a releasable liner to change the state of the adhesive composition to the PSA-like state by irradiating the electromagnetic wave or particle beam. In this case, in order to obtain a temporarily bonded laminate thereafter, the releasable liner is peeled from the adhesive composition and the one of the at least two adherends is laminated to the surface which the releasable liner of the adhesive composition is peeled therefrom. Or, the state of the adhesive composition may be changed to the PSA-like state by irradiating the electromagnetic wave or particle beam after applying the adhesive composition to which the electromagnetic wave or particle beam is not yet irradiated onto a releasable liner and laminating the one of the at least two adherends onto a layer of the adhesive composition. Even in this case, in order to obtain a temporarily bonded laminate thereafter, the releasable liner is peeled from the adhesive composition and the one of the at least two adherends is laminated to the surface which the releasable liner of the adhesive composition is peeled therefrom.

As another method, the adhesive composition to which the electromagnetic wave or particle beam is not yet irradiated is applied to one of the at least two adherends, the electromagnetic wave or particle beam is irradiated to change the state of the adhesive composition to the PSA-like state, a releasable liner is laminated on a surface of the adhesive composition, and then, the releasable liner is peeled and the other of the at least two adherends is laminated to the surface which the releasable liner of the adhesive composition in the PSA-like state is peeled therefrom. Or, the adhesive composition to which the electromagnetic wave or particle beam is not yet irradiated is applied to one of the at least two adherends, the releasable liner is laminated on the adhesive composition, the electromagnetic wave or particle beam is irradiated to change the state of the adhesive composition to the PSA-like state, and then, the releasable liner is peeled and the other of the at least two adherends is laminated to the surface which the releasable liner of the adhesive composition in the PSA-like state is peeled therefrom.

As yet another method, the adhesive composition to which the electromagnetic wave or particle beam is not yet irradiated is applied to a releasable liner, the electromagnetic wave or particle beam is irradiated to change the state of the adhesive composition to the PSA-like state, another releasable liner is laminated to the adhesive composition in the PSA-like state, either one of the releasable liners is peeled, and then, the surface which the releasable liner of the adhesive composition in the PSA-like state is peeled therefrom is transferred to one of the at least two adherends. In this case, in order to obtain a laminate thereafter, the other releasable liner is peeled and the other of the at least two adherends is laminated to the surface which the other releasable liner of the adhesive composition is peeled therefrom. Or, the adhesive composition to which the electromagnetic wave or particle beam is not yet irradiated is applied to the releasable liner, another releasable liner is laminated on the adhesive composition, the electromagnetic wave or particle beam is irradiated to change the state of the adhesive composition to the PSA-like state, and then, one of the releasable liners is peeled, and then, the surface which the releasable liner of the adhesive composition in the PSA-like state is peeled therefrom is transferred to one of the at least two adherends. Even in this case, in order to obtain a laminate thereafter, the other releasable liner is peeled and the other of the at least two adherends is laminated to the surface which the other releasable liner of the adhesive composition is peeled therefrom.

The laminate of the adhesive composition in the PSA-like state and one of the at least two adherends, or, the laminate of the adhesive composition in the PSA-like state and a releasable liner may be used in a form of a sheet, a wound roll or be laminated on a substrate.

The state of lamination of the adherends is inspected after temporary bonding the at least two adherends. When a correction of the lamination is required as a result of the inspection, for example, when misalignment of lamination position or trapping of foreign item or air bubble occurred, the adherends and the adhesive composition need to be peeled. It is not preferable to peel while the adhesive composition is in the PSA-like state, because large force is necessary for peeling and the adhesive composition at the PSA-like state may stay on the adherends. For example, a glass for a current liquid crystal cell is thinner and the size thereof is larger than before. Because of this, when the adhesive strength of the adhesive composition is large, the glass may break when peeling the polarizing film laminated on the liquid crystal cell. And, upsizing of the liquid crystal cell requires a large force to peel the polarizing film from the liquid crystal cell even under the same adhesive strength, because an area of lamination therebetween is large, and this presents a risk of damaging the liquid crystal cell when peeling. Thus, in the method for manufacturing a laminate according to one embodiment of the present invention, when peeling of the adhesive composition and the adherends is required, the electromagnetic wave or particle beam with intensity lower than the critical irradiation intensity is further irradiated to the adhesive composition under a predetermined temperature environment. By irradiating the electromagnetic wave or particle beam for more than the amount necessary to change the state of the adhesive composition to the PSA-like state, the adhesive composition may be cured to a degree where at least one of the at least two adherends and the adhesive composition may be peeled at the interface therebetween without damaging the adherends, and the state of the adhesive composition changes to the easy-to-peel state. At this point, the adhesive strength takes a value in a predetermined range including the local minimum value. At least one of the adherends and the adhesive composition are peeled when the state of the adhesive composition changes to the easy-to-peel state. Thus, pealing at least one of the adherends and the adhesive composition when the state of the adhesive composition changes to the easy-to-peel state provides a merit of eliminating damage to a liquid crystal cell and the adhesive composition remaining on a liquid crystal cell when at least one of the adherends and the adhesive composition in a laminating comprising a liquid crystal cell and a polarizing film are peeled for example.

When correction of the lamination is not required as a result of the inspection after temporary bonding, the at least two adherends are fully bonded. Thus, in the method for manufacturing a laminate according to the present invention, the electromagnetic wave or particle beam with intensity lower than the critical irradiation intensity is further irradiated to the adhesive composition in the PSA-like state under a predetermined temperature environment. By irradiating the electromagnetic wave or particle beam for more than the amount necessary to change the state of the adhesive composition to the easy-to-peel state, the adhesive composition may be fully cured to fully bond the at least two adherends and the adhesive composition. Or, the electromagnetic wave or particle beam with intensity lower than the critical irradiation intensity is further irradiated to the adhesive composition in the PSA-like state under a predetermined temperature environment to change the state of the adhesive composition to the easy-to-peel state, and then maintain the adhesive composition under a temperature environment which the temperature thereof is higher than that of the predetermined temperature environment to fully cure the adhesive composition to fully bond the at least two adherends and the adhesive composition. At this point, the adhesive strength takes a value at least greater than the local maximum value.

In the method for manufacturing a laminate according to another embodiment of the present invention, an inspection of the lamination of the adherends may be performed after changing the state of the adhesive composition to the easy-to-peel state. Performing the inspection after changing the state of the adhesive composition to the easy-to-peel state allows for simultaneously performing the inspection step and the step for peeling an adherend from the adhesive composition when it is found in the inspection step that correction of lamination (the re-work step) is required in one step to further improve efficiency of the re-work. In this case, after temporarily bonding the at least two adherends, the electromagnetic wave or particle beam with intensity lower than the critical irradiation intensity is further irradiated to the adhesive composition in the PSA-like state under a predetermined temperature environment. By irradiating the electromagnetic wave or particle beam with intensity lower than the critical irradiation intensity, the adhesive composition is cured to a degree where at least one of the adherends and the adhesive composition are peeled at the interface therebetween without damaging the at least two adherends and the state of the adhesive composition changes to the easy-to-peel state. At this point, the adhesive strength takes a value in a predetermined range which is smaller than the local maximum value and includes the local minimum value.

On the other hand, when the lamination is inspected when the state of the adhesive composition changes to the easy-to-peel state to find that correction of laminated is not required, the at least two adherends are fully laminated. In this case, in the method for manufacturing a laminate according to the present invention, the electromagnetic wave or particle beam with intensity lower than the critical irradiation intensity is further irradiated to the adhesive composition in the easy-to-peel state under a predetermined temperature environment to fully cure the adhesive composition to fully bond the at least two adherends and the adhesive composition. Or, the adhesive composition in the easy-to-peel state is maintained in a temperature environment which is higher than the predetermined temperature environment for a predetermined time or longer to fully cure the adhesive composition to fully bond the at least two adherends and the adhesive composition. At this point, the adhesive strength takes a value at least greater than the local maximum value.

EXAMPLES

Example 1

One part of a photo-polymerization initiator (Irgacure819 from Ciba Japan K.K.) was added to 100 parts of N-(2-hydroxyethyl)acrylamide monomer (from Kohjin Co., Ltd.) and dissolved to prepare adhesive composition. To accelerate rate of dissolution, ultrasonic wave was applied while heating at 50° C. One milliliter of the adhesive composition was dropped onto a plate glass with a dropping pipette, a polarizing film (VEGQ5724DU from Nitto Denko Corporation) was overlapped thereon, and the polarizing film was pressed with a hand-roller to laminate the polarizing film and the plate glass. The thickness of the adhesive composition was adjusted to 10 μm. Glass transition temperature (Tg) of the adhesive composition was 98° C. The size of the plate glass was 150×50 mm and that of the polarizing film was 140×40 mm.

Since TAC which an ultraviolet absorber is added thereto is used for a protection film of the polarizing film, light with wavelength of 380 nm or less hardly transmits therethrough. Thus, Irgacure819 having absorption of visible light in vicinity of 400 nm was selected as the photo-polymerization initiator. The plate glass laminated with the polarizing film was placed as the glass facing downward onto a hot plate (HHP-411 from As One Corporation) heated to 70° C., and light was irradiated from the polarizing film side with an ultraviolet irradiator (UBX0801-01 from Eye Graphics Co., Ltd., a high voltage mercury lamp with output of 8 kW). For preventing the temperature of the polarizing film or the plate glass overheated than necessary, a heat ray cut filter was mounted between the ultraviolet irradiator and the polarizing film.

Irradiation intensity of the light (measured irradiation intensity) was measured with a measuring device having the wavelength of 405 nm in the measurement range (Eye UV Meter UVPF-A1 from Eye Graphics Co., Ltd.). The irradiation intensity was adjusted so that the irradiation intensity at the wavelength of 405 nm was 7 mW/cm$^2$, which was measured between the irradiation source and the polarizing film. Since the light reaches to the adhesive composition passing through the polarizing film while a part of the light is absorbed by the polarizing film, the irradiation intensity of the light irradiated to the adhesive composition (theoretical irradiation intensity) may be about 30% of the measured irradiation intensity. Thus, the irradiation intensity to the adhesive composition (the theoretical irradiation intensity) is theoretically calculated as 7 mW/cm$^2$×30%=about 2 mW/cm$^2$. The relationship between the measured irradiation intensity and the theoretical irradiation intensity is similarly applied in the following Examples and Comparative Examples.

Adhesive strength was measured with a tensile testing machine (AG-IS, an autograph from Shimadzu Corporation). Electromagnetic wave or particle beam was irradiated to bond the polarizing film and the glass substrate laminated as described above, and then, a 180-degree peel value (peeling force) was measured at room temperature (25° C.) while peeling at a tensile speed of 300 mm/min with the tensile testing machine, and the value was considered as the adhesive strength. Adhesive strength in Examples and Comparative Examples herein was measured similarly.

(1) PSA-Like State

By irradiating light to the adhesive composition in fluid state for 2 seconds from the polarizing film side, the state of the adhesive composition changed to the PSA-like state. The PSA-like state remained for 5 seconds from starting irradiation and 3 seconds from beginning of the PSA-like state. Measured irradiation amount of light from the beginning to the end of the PSA-like state was from 15 to 35 mJ/cm$^2$, and the local maximum value of the adhesive strength was 12N/25 mm.

(2) Easy-to-Peel State

By irradiating light to the adhesive composition in the PSA-like state for 3 seconds or longer from the polarizing film side, the state of the adhesive composition changed to the easy-to-peel state. The easy-to-peel state remained for 21 seconds from starting irradiation (i.e. the fluid state) and 16 seconds from the beginning of the easy-to-peel state. Measured irradiation amount of light from the beginning to the end of the easy-to-peel state was from 35 to 150 mJ/cm$^2$, and the local minimum value of the adhesive strength was 0.5N/25 mm.

(3) Strong Adhesion State

By irradiating light to the adhesive composition in the easy-to-peel state for 16 seconds or longer from the polarizing film side, the state of the adhesive composition changed to the strong adhesion state. By irradiating for 21 seconds or longer from starting irradiation, the state changed to the strong adhesion state. Measured irradiation amount of light at the beginning of the strong adhesion state was 150 mJ/cm$^2$.

FIG. 4 shows elastic modulus of the adhesive composition in the PSA-like state, the easy-to-peel state and the strong adhesion state. The elastic modulus of the adhesive composition according to the present invention is high. There was found a problem in the adhesive composition according to the present invention that shear stress was not measurable when applied because of slippage between a torque sensor of the device and the adhesive composition. To address this, in the adhesive composition according to the present invention, a sample was cut in sheets to apply tensile stress to measure elastic modulus. The elastic modulus was measured with solid viscoelasticity measuring device RSAIII, a dynamic mechanical analyzer from TA Instruments Japan Inc. Conditions for measurement were as follows.

Deformation mode: tension
Frequency: 1 Hz
Initial strain: 0.1%
Temperature: −60° C.~300° C.

Example 2

Measurement of Critical Irradiation Intensity

A half part of a photo-polymerization initiator (Irgacure819 from Ciba Japan K.K.) was added to 100 parts of N-(2-hydroxyethyl)acrylamide monomer (from Kohjin Co., Ltd.) and dissolved to prepare adhesive composition. To accelerate rate of dissolution, ultrasonic wave was applied while heating at 50° C. One milliliter of the adhesive composition was dropped onto a plate glass with a dropping pipette, a polarizing film (VEGQ5724DU from Nitto Denko Corporation) cut in sheets having a width of 25 mm was laminated therewith. The thickness of the adhesive composition was adjusted to 10 μm. The plate glass laminated with the polarizing film was placed in an oven heated to 40° C., and light was irradiated from the polarizing film side with an ultraviolet irradiator (UBX0801-01 from Eye Graphics Co., Ltd., a high voltage mercury lamp with output of 8 kW). For preventing the temperature of the polarizing film or the plate glass overheated than necessary, a heat ray cut filter was mounted between the ultraviolet irradiator and the polarizing film. Glass transition temperature (Tg) of the adhesive composition was 98° C.

The measured irradiation intensity of the light was adjusted so that the intensity at wavelength of 405 nm was varied in 8 cases as 7 mW/cm$^2$, 14 mW/cm$^2$, 21 mW/cm$^2$, 25.4 mW/cm$^2$, 32.5 mW/cm$^2$, 41 mW/cm$^2$, 60 mW/cm$^2$ and 80 mW/cm$^2$. FIG. 3 shows test results for the adhesive strength against glass when irradiation time was varied at different irradiation intensity.

From the table in FIG. 3, it is understood as that the adhesive strength changed to take the local maximum value, then the local minimum value and then a value greater than the local maximum value along with the increase of the irradiation time when the measured irradiation intensity is 41 mW/cm$^2$ or lower. However, as the irradiation intensity increases, the irradiation time for the adhesive strength to take the local minimum value becomes shorter to make control of the adhesive strength more difficult. It is preferable that the irradiation intensity is 32.5 mW/cm$^2$ or lower to facilitate control of the adhesive strength. When the measured irradiation intensity is 32.5 mW/cm$^2$, the light intensity actually reached to the adhesive composition is considered to be about 10 mW/cm$^2$. When the measured irradiation intensity was 60 mW/cm$^2$ or higher, the adhesive strength increased along with the increase of the irradiation time, and did not take the local maximum value or the local minimum value.

Example 3

Control of Adhesive Strength and State by Irradiation Intensity of Electromagnetic Wave or Particle Beam For the same adhesive strength composition in Example 1, change of state of the adhesive composition depending on the irradiation time when varying the irradiation intensity was observed under the same conditions as Example 1 except the irradiation intensity of light. The irradiation intensity at the wavelength of 405 nm was varied in a range from 1.5 to 35 mW/cm$^2$. The result is shown in FIG. 5, where a cross (x) shows that the adhesive composition was at fluid state, a triangle (Δ) shows that the adhesive composition was at PSA-like state, a circle (○) shows that the adhesive composition was at easy-to-peel state, and a double circle (◎) shows that the adhesive composition was at strong adhesion state. From FIG. 5, it is understood that time for the state of the adhesive composition changing to the PSA-like state, time to the easy-to-peel state and time to the strong adhesion state was shortened along with the increase of the irradiation intensity.

Example 4

A half part of a photo-polymerization initiator (Irgacure819 from Ciba Japan K.K.) was added to 100 parts of hydroxymethylacrylamide monomer (from Tokyo Chemical Industry Co., Ltd.) and dissolved to prepare adhesive composition. To accelerate rate of dissolution, ultrasonic wave was applied while heating at 50° C. One milliliter of the adhesive composition was dropped onto a plate glass with a dropping pipette, a polarizing film (VEGQ5724DU from Nitta Denko Corporation) was overlapped thereon, and the polarizing film was pressed with a hand-roller to laminate the polarizing film and the plate glass. Reason for selecting Irgacure819 is the same as in Example 1. The plate glass laminated with the polarizing film was placed as the glass facing downward onto a hot plate (HHP-411 from As One Corporation) heated to 60° C., and light was irradiated from the polarizing film side with an ultraviolet irradiator (UBX0801-01 from Eye Graphics Co., Ltd., a high voltage mercury lamp with output of 8 kW). For preventing the temperature of the polarizing film or the plate glass overheated than necessary, a heat ray cut filter was mounted between the ultraviolet irradiator and the polarizing film. Irradiation intensity of the light was measured with a measuring device having the wavelength of 405 nm in the measurement range (Eye UV Meter UVPF-A1 from Eye Graphics Co., Ltd.). The irradiation intensity was adjusted so that the irradiation intensity at the wavelength of 405 nm was 14 mW/cm$^2$.

By irradiating light to the laminate of the polarizing film and the plate glass via the adhesive composition in fluid state for 1.5 seconds, the state of the adhesive composition changed to the PSA-like state. By further irradiating light for 10 seconds, the state of the adhesive composition changed to the easy-to-peel state and remained for 50 seconds from the beginning thereof. Then, by raising the temperature of the hot plate to 120° C. and further irradiating light for 60 seconds or longer, the state of the adhesive composition changed to the strong adhesion state.

Example 5

Conditions for Example 5 were the same as Example 4 except that hydroxymethylacrylamide monomer (from Tokyo Chemical Industry Co., Ltd.) in Example 4 was changed to hydroxyethylacrylamide monomer (from Kohjin Co., Ltd.) to prepare adhesive composition.

By irradiating light to the laminate of the polarizing film and the plate glass via the adhesive composition in fluid state for 2 seconds, the state of the adhesive composition changed to the PSA-like state. By further irradiating light for 10 seconds, the state of the adhesive composition changed to the easy-to-peel state and remained for 50 seconds from the beginning thereof. Then, by further irradiating light for 60 seconds or longer, the state of the adhesive composition changed to the strong adhesion state. The Tg of the adhesive composition was 98° C.

In Example 5, by irradiating light to the laminate of the polarizing film and the plate glass via the adhesive composition in fluid state for 2 seconds, the state of the adhesive composition changed to the PSA-like state. By further irradiating light for 30 seconds, the state of the adhesive composition changed to the easy-to-peel state. Then, by raising the temperature of the hot plate to 100° C. and continued heating for 300 seconds without irradiating light, the state of the adhesive composition changed to the strong adhesion state.

In Example 5, by irradiating light to the laminate with the irradiation intensity changed from 14 mW/cm$^2$ to 80 mW/cm$^2$ but the other conditions maintained as Example 5, the adhesive composition in the fluid state changed to the strong adhesion state in 1.5 seconds and remained at the strong adhesion state even after extending the irradiation time.

Example 6

A half part of a photo-polymerization initiator (Irgacure819 from Ciba Japan K.K.) was added to 100 parts of hydroxypropylacrylamide monomer (from Fluka) and dissolved to prepare adhesive composition. To accelerate rate of dissolution, ultrasonic wave was applied while heating at 50° C. One milliliter of the adhesive composition was dropped onto a plate glass with a dropping pipette, and the plate glass was placed on a hot plate (HHP-411 from As One Corporation) heated to 100° C. to evaporate moisture. After moisture evaporated, a polarizing film (VEGQ5724DU from Nitto Denko Corporation) was overlapped on the adhesive composition on the plate glass, and the polarizing film was pressed with a hand-roller to laminate the polarizing film and the plate glass. The plate glass laminated with the polarizing film was placed as the glass facing downward onto the hot plate, and light was irradiated from the polarizing film side with an ultraviolet irradiator (UBX0801-01 from Eye Graphics Co., Ltd., a high voltage mercury lamp with output of 8 kW). For preventing the temperature of the polarizing film or the plate glass overheated than necessary, a heat ray cut filter was mounted between the ultraviolet irradiator and the polarizing film. Irradiation intensity of the light was measured with a measuring device having the wavelength of 405 nm in the measurement range (Eye UV Meter UVPF-A1 from Eye Graphics Co., Ltd.). The irradiation intensity was adjusted so that the irradiation intensity at the wavelength of 405 nm was 14 mW/cm$^2$.

By irradiating light to the laminate of the polarizing film and the plate glass via the adhesive composition in fluid state for 1 second, the state of the adhesive composition changed to the PSA-like state. By further irradiating light for 10 seconds, the state of the adhesive composition changed to the easy-to-peel state. Then, by further irradiating light for 20 seconds or longer, the state of the adhesive composition changed to the strong adhesion state. The Tg of the adhesive composition was 74° C.

Example 7

Conditions for Example 7 were the same as Example 4 except that hydroxymethylacrylamide monomer (from Tokyo Chemical Industry Co., Ltd.) in Example 4 was changed to dimethylacrylamide monomer (from Kohjin Co., Ltd.) to prepare adhesive composition.

By irradiating light to the laminate of the polarizing film and the plate glass via the adhesive composition in fluid state for 1 second, the state of the adhesive composition changed to the PSA-like state. By further irradiating light for 10 seconds, the state of the adhesive composition changed to the easy-to-peel state and remained for 50 seconds from the beginning thereof. Then, by further irradiating light for 60 seconds or longer, the state of the adhesive composition changed to the strong adhesion state. The Tg of the adhesive composition was 119° C.

Example 8

Conditions for Example 8 were the same as Example 4 except that hydroxymethylacrylamide monomer (from Tokyo Chemical Industry Co., Ltd.) in Example 4 was changed to diethylacrylamide monomer (from Kohjin Co., Ltd.) to prepare adhesive composition.

By irradiating light to the laminate of the polarizing film and the plate glass via the adhesive composition in fluid state for 1 second, the state of the adhesive composition changed to the PSA-like state. By further irradiating light for 10 seconds, the state of the adhesive composition changed to the easy-to-peel state and remained for 20 seconds from the beginning thereof. Then, by further irradiating light for 30 seconds or longer, the state of the adhesive composition changed to the strong adhesion state. The Tg of the adhesive composition was 81° C.

Example 9

A half part of a photo-polymerization initiator (Irgacure819 from Ciba Japan K.K.) was added to 100 parts of acrylic acid monomer (from Toagosei Co., Ltd.) and dissolved to prepare adhesive composition. To accelerate rate of dissolution, ultrasonic wave was applied while heating at 50° C. Silane coupling agent was applied to a plate glass with a spinning coater and the plate glass was heated at 100° C. for 1 minute. One milliliter of the adhesive composition was dropped onto the plate glass with a dropping pipette, and a polarizing film (VEGQ5724DU from Nitto Denko Corporation) was overlapped thereon, and the polarizing film was pressed with a hand-roller to laminate the polarizing film and the plate glass. The plate glass laminated with the polarizing film was placed as the glass facing downward onto a hot plate (HHP-411 from As One Corporation) heated to 80° C., and light was irradiated from the polarizing film side with an ultraviolet irradiator (UBX0801-01 from Eye Graphics Co., Ltd., a high voltage mercury lamp with output of 8 kW). For preventing the temperature of the polarizing film or the plate glass overheated than necessary, a heat ray cut filter was mounted between the ultraviolet irradiator and the polarizing film. Irradiation intensity of the light was measured with a measuring device having the wavelength of 405 nm in the measurement range (Eye UV Meter UVPF-A1 from Eye Graphics Co., Ltd.). The irradiation intensity was adjusted so that the irradiation intensity at the wavelength of 405 nm was 14 mW/cm$^2$.

By irradiating light to the laminate of the polarizing film and the plate glass via the adhesive composition in fluid state for 1 second, the state of the adhesive composition changed to the PSA-like state. By further irradiating light for 10 seconds, the state of the adhesive composition changed to the easy-to-peel state and remained for 50 seconds from the beginning thereof. Then, by further irradiating light for 60 seconds or longer, the state of the adhesive composition changed to the strong adhesion state. The Tg of the adhesive composition was 106° C.

Example 10

Conditions for Example 10 were the same as Example 4 except that hydroxymethylacrylamide monomer (from Tokyo Chemical Industry Co., Ltd.) in Example 4 was changed to 2-hydroxyethylacrylate monomer (from Nippon Shokubai Co., Ltd.) to prepare adhesive composition.

By irradiating light to the laminate of the polarizing film and the plate glass via the adhesive composition in fluid state for 5 seconds, the state of the adhesive composition changed to the PSA-like state. By further irradiating light for 30 seconds, the state of the adhesive composition changed to the easy-to-peel state and remained for 30 seconds from the beginning thereof. Then, by further irradiating light for 60 seconds or longer, the state of the adhesive composition changed to the strong adhesion state. The Tg of the adhesive composition was −15° C.

Example 11

Conditions for Example 11 were the same as Example 4 except that hydroxymethylacrylamide monomer (from Tokyo Chemical Industry Co., Ltd.) in Example 4 was changed to acrylonitrile monomer (from Wako Pure Chemical Industries, Ltd.) to prepare adhesive composition.

By irradiating light to the laminate of the polarizing film and the plate glass via the adhesive composition in fluid state for 1 second, the state of the adhesive composition changed to the PSA-like state and remained for 9 seconds from the beginning thereof. By further irradiating light for 15 seconds, the state of the adhesive composition changed to the easy-to-peel state and remained for 105 seconds from the beginning thereof. Then, by further irradiating light for 120 seconds or longer, the state of the adhesive composition changed to the strong adhesion state. The Tg of the adhesive composition was 97° C.

Example 12

Conditions for Example 12 were the same as Example 4 except that hydroxymethylacrylamide monomer (from Tokyo Chemical Industry Co., Ltd.) in Example 4 was changed to acryloyl morpholine monomer (from Kohjin Co., Ltd.) to prepare adhesive composition.

By irradiating light to the laminate of the polarizing film and the plate glass via the adhesive composition in fluid state for 1 second, the state of the adhesive composition changed to the PSA-like state. By further irradiating light for 3 seconds, the state of the adhesive composition changed to the easy-to-peel state and remained for 57 seconds from the beginning thereof. Then, by further irradiating light for 60 seconds or longer, the state of the adhesive composition changed to the strong adhesion state. The Tg of the adhesive composition was 145° C.

Example 13

Conditions for Example 13 were the same as Example 4 except that hydroxymethylacrylamide monomer (from Tokyo Chemical Industry Co., Ltd.) in Example 4 was changed to N-methyl methacrylamide monomer (from Tokyo Chemical Industry Co., Ltd.) and that the heating temperature of the hot plate was raised to 120° C. from 60° C. to prepare adhesive composition.

By irradiating light to the laminate of the polarizing film and the plate glass via the adhesive composition in fluid state for 30 seconds, the state of the adhesive composition changed to the PSA-like state. By further irradiating light for 90 seconds, the state of the adhesive composition changed to the easy-to-peel state. Then, by further irradiating light for 120 seconds or longer, the state of the adhesive composition changed to the strong adhesion state.

Example 14

Conditions for Example 12 were the same as Example 4 except that hydroxymethylacrylamide monomer (from Tokyo Chemical Industry Co., Ltd.) in Example 4 was changed to glycidyl methacrylate monomer (from Kishida Chemical Co., Ltd.) to prepare adhesive composition.

By irradiating light to the laminate of the polarizing film and the plate glass via the adhesive composition in fluid state for 30 seconds, the state of the adhesive composition changed to the PSA-like state and remained for 90 seconds from the beginning thereof. By changing the temperature of the hot plate to 80° C. and further irradiating light for 30 seconds, the state of the adhesive composition changed to the easy-to-peel state and remained for 90 seconds from the beginning thereof. Then, by further irradiating light for 240 seconds or longer, the state of the adhesive composition changed to the strong adhesion state. The Tg of the adhesive composition was 46° C.

Example 15

Conditions for Example 15 were the same as Example 4 except that hydroxymethylacrylamide monomer (from Tokyo Chemical Industry Co., Ltd.) in Example 4 was changed to tetrahydrofurfuryl methacrylate monomer (from Tokyo Chemical Industry Co., Ltd.) and that the heating temperature of the hot plate was raised to 120° C. from 60° C. to prepare adhesive composition.

By irradiating light to the laminate of the polarizing film and the plate glass via the adhesive composition in fluid state for 30 seconds, the state of the adhesive composition changed to the PSA-like state and remained for 30 seconds from the beginning thereof. By further irradiating light for 60 seconds, the state of the adhesive composition changed to the easy-to-peel state and remained for 60 seconds from the beginning thereof. Then, by further irradiating light for 240 seconds or longer, the state of the adhesive composition changed to the strong adhesion state. The Tg of the adhesive composition was 60° C.

Example 16

Conditions for Example 16 were the same as Example 5 except that hydroxyethylacrylamide monomer (from Kohjin Co., Ltd.) in Example 5 was changed to a mixture of 50 parts of hydroxyethylacrylamide monomer (from Kohjin Co., Ltd.) and 50 parts of methyl methacrylate monomer (from Wako Pure Chemical Industries, Ltd.) to prepare adhesive composition.

By irradiating light to the laminate of the polarizing film and the plate glass via the adhesive composition in fluid state for 3 seconds, the state of the adhesive composition changed to the PSA-like state and remained for 27 seconds from the beginning thereof. By further irradiating light for 10 seconds, the state of the adhesive composition changed to the easy-to-peel state. Then, by further irradiating light for 20 seconds or longer, the state of the adhesive composition changed to the strong adhesion state.

Example 17

A layer of the adhesive composition of Example 2 was formed for a thickness of 10 μm on an anti-glare film (AG150 from Nitto Denko Corporation) using a bar coater. By irradiating light of wavelength 405 nm to the anti-glare film with the adhesive composition from the adhesive layer side in an oven at 40° C. for 3 seconds at irradiation intensity of 7 mW/cm$^2$, the state of the adhesive composition changed to the PSA-like state. This anti-glare film with the adhesive composition in the PSA-like state was laminated with an organic EL display (XEL-1 from Sony Corporation) which a low-reflection film laminated on the top surface on the viewing side with a PSA was released therefrom. Since the lamination was performed while the adhesive composition was in the PSA-like state, the lamination was successfully completed without misalignment in the lamination or trapping air bubble. By further irradiation the light for 20 seconds (23 seconds from the beginning of the irradiation), the state of the adhesive composition changed to the easy-to-peel state. Then, by further irradiating light for 40 seconds (63 seconds from the beginning of the irradiation), the state of the adhesive composition changed to the strong adhesion state.

The anti-glare film with the adhesive composition in the PSA-like state prepared was laminated with the organic EL display under the same conditions. By irradiating light for 20 seconds while heating, the state of the adhesive composition changed to the easy-to-peel state. When the anti-glare film was peeled from the organic EL display, it was easily peeled at an interface between the glass of the organic EL display and the adhesive composition without cohesion failure thereof. The organic EL display was not damaged either. After peeling, it was not possible to laminate the anti-glare film with the organic EL display even by overlapping.

Example 18

A layer of the adhesive composition of Example 2 was formed for a thickness of 10 μm on a polarizing film (VEGQ5724DU from Nitto Denko Corporation) using a bar coater. By irradiating light of wavelength 405 nm to the polarizing film with the adhesive composition from the adhesive layer side in an oven at 40° C. for 1 second at irradiation intensity of 30 mW/cm$^2$, the state of the adhesive composition changed to the PSA-like state. This polarizing film with the adhesive composition in the PSA-like state was laminated with a liquid crystal cell obtained by peeling a polarizing film from a liquid crystal panel of a liquid crystal television (LC-32DE5 from Sharp Corporation). By further irradiating light of wavelength 405 nm from the polarizing film side in an oven at 40° C. for 20 seconds (22 seconds from the beginning of the irradiation) at irradiation intensity of 14 mW/cm$^2$, the state of the adhesive composition changed to the easy-to-peel state. Then, by further irradiating light of wavelength 405 nm from the polarizing film side in an oven at 80° C. for 40 seconds (62 seconds from the beginning of the irradiation) at irradiation intensity of 14 mW/cm$^2$, the state of the adhesive composition changed to the strong adhesion state.

After the state of adhesive composition changed to the strong adhesion state, the liquid crystal cell laminated with the polarizing film was immersed in hot water at 60° C. for 1 day. When the liquid crystal cell was taken out of hot water, the polarizing film was easily peeled from the liquid crystal cell.

A polarizing film with the adhesive composition in the PSA-like state prepared under the same conditions as above was laminated with the above liquid crystal cell. Light was irradiated while heating to change the state of the adhesive composition to the easy-to-peel state. Then, when the polarizing film was peeled from the liquid crystal panel, it was easily peeled from the liquid crystal cell. There was no damage to the liquid crystal cell.

Example 19

A liquid crystal cell which a polarizing film peeled therefrom was prepared by peeling the polarizing film from a liquid crystal panel of a liquid crystal television (LC-32DE5 from Sharp Corporation). Using the adhesive composition of Example 2, a layer of the adhesive composition of Example 2 was formed for a thickness of 10 μm on each of two polarizing films (VEGQ5724DU from Nitta Denko Corporation) using a bar coater. Light of wavelength 405 nm was irradiated to the two polarizing films with the adhesive composition formed thereon in an oven at 30° C. for 1 second at irradiation intensity of 30 mW/cm$^2$, and the state of the adhesive composition changed to the PSA-like state. Each of the two polarizing films with the adhesive composition in the PSA-like state was laminated to a viewing side and a backlight side of the prepared liquid crystal cell such that the polarizing axis was perpendicular to each other. Then, by irradiating light of wavelength 405 nm from the polarizing film side in an oven at 80° C. for 60 seconds (61 seconds from the beginning of the irradiation) at irradiation intensity of 14 mW/cm$^2$, the state of the adhesive composition changed to the strong adhesion state.

After the state of adhesive composition changed to the strong adhesion state, the liquid crystal panel laminated with the polarizing film was kept in an oven at 80° C. for 100 hours. Unlike later described Comparative Example 1 using a PSA, unevenness of brightness within the surface (unwanted light penetration at four corners) was not found. Since the adhesive composition was hard, reduction of hardness of a liquid crystal panel surface as one occurred when laminating with a PSA was not found.

Example 20

A liquid crystal cell which a polarizing film peeled therefrom was prepared by peeling the polarizing film from a liquid crystal panel of a liquid crystal television (LC-32DE5 from Sharp Corporation). Using the adhesive composition of Example 2, a layer of the adhesive composition of Example 2 was formed for a thickness of 10 μm on each of two polarizing films (VEGQ5724DU and VEGQ5724NTB-V1 from Nitto Denko Corporation) using a bar coater. A releasable liner (MRF38 from Mitsubishi Plastics, Inc.) was laminated with each of the two polarizing films which the layer of the adhesive composition formed thereon. Light of wavelength 405 nm was irradiated from the polarizing film side under a temperature environment of 25° C. for 1 second at irradiation intensity of 10 mW/cm$^2$, and the state of the adhesive composition changed to the PSA-like state. The releasable liner was peeled from each of the two polarizing films with the adhesive composition in the PSA-like state, and each of the two polarizing films was laminated to a viewing side and a backlight side of the prepared liquid crystal cell such that the polarizing axis was perpendicular to each other. By further irradiating light of wavelength 405 nm from the polarizing film side in an oven at 40° C. for 30 seconds (31 seconds from the beginning of the irradiation) at irradiation intensity of 14 mW/cm$^2$, the state of the adhesive composition changed to the easy-to-peel state. Then, by further irradiating light of wavelength 405 nm from the polarizing film side in an oven at 80° C. for 30 seconds (61 seconds from the beginning of the irradiation) at irradiation intensity of 14 mW/cm$^2$, the state of the adhesive composition changed to the strong adhesion state.

When the polarizing film was peeled from the liquid crystal cell after the state of the adhesive composition changed to the easy-to-peel state, the peeling force was light enough not to cause cracking or to reduce visibility of the liquid crystal cell.

After the state of adhesive composition changed to the strong adhesion state, the liquid crystal panel laminated with the polarizing film was kept in an oven at 80° C. for 100 hours. Unlike later described Comparative Example 1 using a PSA, unevenness of brightness within the surface (unwanted light penetration at four corners) was not found. Since the adhesive composition was hard, reduction of hardness of a liquid crystal panel surface as one occurred when laminating with a PSA was not found.

After laminating the polarizing film with the adhesive composition in the PSA-like state, light of wavelength of 405 nm was further irradiated in an oven at 80° C. for 60 seconds at irradiation intensity of 14 mW/cm$^2$, and the state of the adhesive composition changed to the strong adhesion state. Thus, it is confirmed that the state of the adhesive composition changes to the strong adhesion state by irradiating light without intermission while the adhesive composition was in the easy-to-peel state.

Example 21

A half part of a photo-polymerization initiator (Irgacure819 from Ciba Japan K.K.) was added to 100 parts of dicyclopentenyl acrylate monomer (from Hitachi Chemical Co., Ltd.) and dissolved to prepare adhesive composition. To accelerate rate of dissolution, ultrasonic wave was applied while heating at 50° C. One milliliter of the adhesive composition was dropped onto cycloolefin film (Zeonor from Zeon Corporation), and another cycloolefin film (Zeonor from Zeon Corporation) was overlapped thereon, and the films were pressed to prepare a laminated film. The laminated film was placed on a hot plate (HHP-411 from As One Corporation) heated to 120° C., and light was irradiated with an ultraviolet irradiator (UBX0801-01 from Eye Graphics Co., Ltd., a high voltage mercury lamp with output of 8 kW). For preventing the temperature of the laminated film overheated than necessary, a heat ray cut filter was mounted between the ultraviolet irradiator and the film. The irradiation intensity was adjusted so that the irradiation intensity at the wavelength of 405 nm was 14 mW/cm$^2$.

By irradiating light to the laminated film for 15 seconds, the state of the adhesive composition changed to the PSA-like state. By further irradiating light to the laminated film for 30 seconds, the state of the adhesive composition changed to the easy-to-peel state. By further irradiating light to the laminated film for 120 seconds or longer, the state of the adhesive composition changed to the strong adhesion state.

Example 22

One-side-protected polarizing film was prepared by removing a polarizer protection film from one surface of the polarizing film (VEGQ5724DU from Nitto Denko Corporation), and the one-side-protected polarizing film was laminated with a liquid crystal cell obtained by peeling a polarizing film from a liquid crystal panel of a liquid crystal television (LC-32DE5 from Sharp Corporation) with the same adhesive composition as Example 2. The liquid crystal cell laminated with the one-side-protected polarizing film was placed in an oven heated at 40° C., and light was irradiated with an ultraviolet irradiator (UBX0801-01 from Eye Graphics Co., Ltd., a high voltage mercury lamp with output of 8 kW) from the polarizing film side. For preventing the temperature of the polarizing film or the glass overheated than necessary, a heat ray cut filter was mounted between the ultraviolet irradiator and the film. Irradiation intensity of the light was measured with a measuring device having the wavelength of 405 nm in the measurement range (Eye UV Meter UVPF-A1 from Eye Graphics Co., Ltd.). The irradiation intensity was adjusted so that the irradiation intensity at the wavelength of 405 nm was 14 mW/cm$^2$.

By irradiating light to the laminate of the liquid crystal cell and the one-side-protected polarizing film via the adhesive composition in fluid state for 1.5 seconds, the state of the adhesive composition changed to the PSA-like state. By further irradiating light to the laminated film for 10 seconds, the state of the adhesive composition changed to the easy-to-peel state and remained for 50 seconds after the beginning thereof. By further irradiating light to the laminated film for 60 seconds or longer, the state of the adhesive composition changed to the strong adhesion state.

Light was irradiated to the laminate of the liquid crystal cell and the one-side-protected polarizing film via the adhesive composition in fluid state for 1.5 seconds to change the state of the adhesive composition to the PSA-like state, and the light was further irradiated for 30 seconds to change the state of to the easy-to-peel state. Then, when the one-side-protected polarizing film was peeled from the liquid crystal cell, the peeling force was light enough not to cause cracking or to reduce visibility of the liquid crystal cell.

Example 23

One-side-protected polarizing film was prepared by removing a polarizer protection film from one surface of the polarizing film (VEGQ5724DU from Nitto Denko Corporation), and a layer of the adhesive composition of Example 2 was formed thereon for a thickness of 10 μm with a bar coater. By irradiating light of wavelength 405 nm to the one-side-protected polarizing film with the adhesive composition from the polarizing film side in an oven at 30° C. for 1 second at irradiation intensity of 30 mW/cm$^2$, the state of the adhesive composition changed to the PSA-like state. The one-side-protected polarizing film with the adhesive composition was laminated with a liquid crystal cell obtained by peeling a polarizing film from a liquid crystal panel of a liquid crystal television (LC-32DE5 from Sharp Corporation). Then, by further irradiating light of wavelength of 405 nm from the one-side-protected polarizing film side in an oven at 40° C. for 20 seconds (21 seconds from the beginning of the irradiation) at irradiation intensity of 14 mW/cm$^2$, the state of the adhesive composition changed to the easy-to-peel state. By further irradiating light of wavelength of 405 nm from the one-side-protected polarizing film side in an oven at 80° C. for 40 seconds (61 seconds from the beginning of the irradiation) at irradiation intensity of 14 mW/cm$^2$, the state of the adhesive composition changed to the strong adhesion state.

When a heat-shock test, one of durability tests for a polarizing film, was performed on the liquid crystal panel in which the one-side-protected polarizing film and the liquid crystal cell were laminated in the strong adhesion state, unlike the later described Example 2 where a PSA was used, no crack occurred in the one-side-protected polarizing film. The heat-shock test was performed by repeating 100 cycles of alternatively keeping the liquid crystal panel under a temperature environment of −40° C. and that of 85° C. for 30 minutes each.

Since the adhesive composition in the liquid crystal panel was hard, reduction of hardness of a liquid crystal panel surface as one occurred when laminating with a PSA was not found.

When the polarizing film was peeled from the liquid crystal cell after the state of the adhesive composition changed to the easy-to-peel state, the peeling force was light enough not to cause cracking or to reduce visibility of the liquid crystal cell.

After laminating the one-side-protected polarizing film with the adhesive composition in the PSA-like state and the liquid crystal cell, by irradiating light of wavelength of 405 nm in an oven at 80° C. for 60 seconds at irradiation intensity of 14 mW/cm², the state of the adhesive composition changed to the strong adhesion state.

Example 24

One part of a photo-polymerization initiator (Irgacure819 from Ciba Japan K.K.) was added to 100 parts of 2-isocyanatoethyl acrylate monomer (Karenz AOI from Showa Denko K.K.) and dissolved to prepare adhesive composition. To accelerate rate of dissolution, ultrasonic wave was applied while heating at 50° C. One milliliter of the adhesive composition was dropped onto a plate glass with a dropping pipette, and a polarizing film (VEGQ5724DU from Nitto Denko Corporation) was overlapped thereon, and the polarizing film was pressed with a hand-roller to laminate the polarizing film and the plate glass. The plate glass laminated with the polarizing film was placed as the glass facing downward onto a hot plate (HHP-411 from As One Corporation) heated to 60° C., and light was irradiated from the polarizing film side with an ultraviolet irradiator (UBX0801-01 from Eye Graphics Co., Ltd., a high voltage mercury lamp with output of 8 kW). For preventing the temperature of the polarizing film or the plate glass overheated than necessary, a heat ray cut filter was mounted between the ultraviolet irradiator and the polarizing film. Irradiation intensity of the light was measured with a measuring device having the wavelength of 405 nm in the measurement range (Eye UV Meter UVPF-A1 from Eye Graphics Co., Ltd.). The irradiation intensity was adjusted so that the irradiation intensity at the wavelength of 405 nm was 14 mW/cm².

By irradiating light to the laminate of the polarizing film and the plate glass via the adhesive composition in fluid state for 30 seconds, the state of the adhesive composition changed to the PSA-like state. By further irradiating light for 90 seconds, the state of the adhesive composition changed to the easy-to-peel state. Then, by further irradiating light for 120 seconds, the state of the adhesive composition changed to the strong adhesion state.

Example 25

One part of a photo-polymerization initiator (Irgacure819 from Ciba Japan K.K.) was added to 100 parts of 2-isocyanatoethyl methacrylate monomer (Karenz MOI from Showa Denko K.K.) and dissolved to prepare adhesive composition. To accelerate rate of dissolution, ultrasonic wave was applied while heating at 50° C. One milliliter of the adhesive composition was dropped onto a plate glass with a dropping pipette, and a polarizing film (VEGQ5724DU from Nitto Denko Corporation) was overlapped thereon, and the polarizing film was pressed with a hand-roller to laminate the polarizing film and the plate glass. The plate glass laminated with the polarizing film was placed as the glass facing downward onto a hot plate (HHP-411 from As One Corporation) heated to 80° C., and light was irradiated from the polarizing film side with an ultraviolet irradiator (UBX0801-01 from Eye Graphics Co., Ltd., a high voltage mercury lamp with output of 8 kW). For preventing the temperature of the polarizing film or the plate glass overheated than necessary, a heat ray cut filter was mounted between the ultraviolet irradiator and the polarizing film. Irradiation intensity of the light was measured with a measuring device having the wavelength of 405 nm in the measurement range (Eye UV Meter UVPF-A1 from Eye Graphics Co., Ltd.). The irradiation intensity was adjusted so that the irradiation intensity at the wavelength of 405 nm was 14 mW/cm².

By irradiating light to the laminate of the polarizing film and the plate glass via the adhesive composition in fluid state for 5 seconds, the state of the adhesive composition changed to the PSA-like state. By further irradiating light for 25 seconds, the state of the adhesive composition changed to the easy-to-peel state. Then, by further irradiating light for 90 seconds, the state of the adhesive composition changed to the strong adhesion state.

Example 26

One part of a photo-polymerization initiator (Irgacure819 from Ciba Japan K.K.) was added to 100 parts of γ-butyrolactone acylate monomer (GBLA from Osaka Organic Chemical Industry Ltd.) and dissolved to prepare adhesive composition. To accelerate rate of dissolution, ultrasonic wave was applied while heating at 50° C. One milliliter of the adhesive composition was dropped onto a plate glass with a dropping pipette, and a polarizing film (VEGQ5724DU from Nitto Denko Corporation) was overlapped thereon, and the polarizing film was pressed with a hand-roller to laminate the polarizing film and the plate glass. The plate glass laminated with the polarizing film was placed as the glass facing downward onto a hot plate (HHP-411 from As One Corporation) heated to 60° C., and light was irradiated from the polarizing film side with an ultraviolet irradiator (UBX0801-01 from Eye Graphics Co., Ltd., a high voltage mercury lamp with output of 8 kW). For preventing the temperature of the polarizing film or the plate glass overheated than necessary, a heat ray cut filter was mounted between the ultraviolet irradiator and the polarizing film. Irradiation intensity of the light was measured with a measuring device having the wavelength of 405 nm in the measurement range (Eye UV Meter UVPF-A1 from Eye Graphics Co., Ltd.). The irradiation intensity was adjusted so that the irradiation intensity at the wavelength of 405 nm was 14 mW/cm².

By irradiating light to the laminate of the polarizing film and the plate glass via the adhesive composition in fluid state for 3 seconds, the state of the adhesive composition changed to the PSA-like state. By further irradiating light for 7 seconds, the state of the adhesive composition changed to the easy-to-peel state. Then, by further irradiating light for 30 seconds, the state of the adhesive composition changed to the strong adhesion state.

Example 27

One part of a photo-polymerization initiator (Irgacure819 from Ciba Japan K.K.) was added to 100 parts of γ-butyrolactone methacylate monomer (GBLMA from Osaka Organic Chemical Industry Ltd.) and dissolved to prepare adhesive composition. To accelerate rate of dissolution, ultrasonic wave was applied while heating at 50° C. One milliliter of the adhesive composition was dropped onto a plate glass with a dropping pipette, and a polarizing film (VEGQ5724DU from Nitto Denko Corporation) was overlapped thereon, and the polarizing film was pressed with a hand-roller to laminate the polarizing film and the plate glass. The plate glass laminated with the polarizing film was placed as the glass facing downward onto a hot plate (HHP-411 from As One Corporation) heated to 120° C., and light was irradiated from the polarizing film side with an ultraviolet irradiator (UBX0801-01 from Eye Graphics Co., Ltd., a high voltage mercury lamp with output of 8 kW). For preventing the temperature of the polarizing film or the plate glass overheated than necessary, a heat ray cut filter was mounted between the ultraviolet irradiator and the polarizing film. Irradiation intensity of the light was measured with a measuring device having the wavelength of 405 nm in the measurement range (Eye UV Meter UVPF-A1 from Eye Graphics Co., Ltd.). The irradiation intensity was adjusted so that the irradiation intensity at the wavelength of 405 nm was 14 mW/cm$^2$.

By irradiating light to the laminate of the polarizing film and the plate glass via the adhesive composition in fluid state for 3 seconds, the state of the adhesive composition changed to the PSA-like state. By further irradiating light for 50 seconds, the state of the adhesive composition changed to the easy-to-peel state. Then, by further irradiating light for 180 seconds, the state of the adhesive composition changed to the strong adhesion state.

Comparative Example 1

A polarizing film (VEGQ5724DU from Nitto Denko Corporation) which a 20 μm-thick layer of acrylic PSA laminated thereon was laminated on a plate glass with a hand roller. Light of wavelength of 400 nm was irradiated to the laminate of the polarizing film and the plate glass under the same conditions as Example 4. However, the adhesive strength did not change as to take the local maximum value or the local minimum value even by increasing the irradiation amount.

Since a PSA was used for lamination, it was possible to peel the polarizing film from the liquid crystal cell, but a greater peeling force was required when compared with a case where the adhesive composition according to the present invention was in the easy-to-peel state. Particularly, it was necessary to peel slowly when peeling a polarizing film from a large-size liquid crystal panel, otherwise problems, such as cracking of the liquid crystal cell, breakage of the polarizing film or reduction of visibility by force applied to the liquid crystal panel might be caused. In addition, the adhesive strength of the PSA did not decrease even by immersing in water.

A polarizing film was peeled from a liquid crystal panel of a liquid crystal television (Bravia KDL-40V1 from Sony Corporation) to prepare a liquid crystal cell, and one of two polarizing films with the adhesive composition in the PSA-like state was laminated to a viewing side and a backlight side of the prepared liquid crystal cell such that the polarizing axis was perpendicular to each other. When the liquid crystal panel was heated at 80° C. for 100 hours, unevenness of brightness (unwanted light penetration) at four corners thereof occurred. In addition, surface hardness of the polarizing film was reduced from that of the liquid crystal panel using the adhesive composition according to the present invention. It was considered as that it was due to a dent generated on the polarizing film by pushing force because the PSA was soft.

Comparative Example 2

The one-side-protected polarizing film prepared in Example 22 was laminated to a liquid crystal cell with a 20 μm-thick acrylic PSA to form a liquid crystal panel. Since a PSA was used for lamination, it was possible to peel the polarizing film from the liquid crystal cell, but a greater peeling force was required when compared with a case where the adhesive composition according to the present invention was in the easy-to-peel state. Since a protection film for polarizer existed on only one surface of the polarizing film, the polarizing film was prone to break when peeling. Particularly, it was necessary to peel slowly when peeling a polarizing film from a large-size liquid crystal panel, otherwise problems, such as cracking of the liquid crystal cell, breakage of the polarizing film or reduction of visibility by force applied to the liquid crystal panel might be caused.

When a heat shock test was performed to the liquid crystal panel under the same conditions as Example 23, many cracks occurred on the polarizing film.

In addition, surface hardness of the polarizing film was reduced from that of the liquid crystal panel using the adhesive composition according to the present invention. It was considered as that it was due to a dent generated on the polarizing film by pushing force because the PSA was soft. Even when compared with the polarizing film used in Comparative Example 1 which a protection film was laminated on both surfaces thereof, reduction of surface hardness was large because the thickness of the polarizing film was thin.

Comparative Example 3

A half part of a photo-polymerization initiator (Irgacure819 from Ciba Japan K.K.) was added to 100 parts of methyl methacrylate monomer (from Wako Pure Chemical Industries, Ltd.) and dissolved to prepare adhesive composition. To accelerate rate of dissolution, ultrasonic wave was applied while heating at 50° C. One milliliter of methyl methacrylate monomer was dropped onto a plate glass, and a polarizing film (VEGQ5724DU from Nitta Denko Corporation) was overlapped thereon, and laminated with a hand roller. The plate glass laminated with the polarizing film was placed as the glass facing downward onto a hot plate (HHP-411 from As One Corporation) heated to 60° C., and light was irradiated from the polarizing film side with an ultraviolet irradiator (UBX0801-01 from Eye Graphics Co., Ltd., a high voltage mercury lamp with output of 8 kW). For preventing the temperature of the polarizing film or the plate glass overheated than necessary, a heat ray cut filter was mounted between the ultraviolet irradiator and the polarizing film. Light with irradiation intensity of 14 mW/cm$^2$ at wavelength of 405 nm was irradiated from the polarizing film side.

By irradiating light to the laminate of the polarizing film and the plate glass via the adhesive composition in fluid state for 3 seconds, the state of the adhesive composition changed to the PSA-like state. By further irradiating light for 30 seconds, the state of the adhesive composition changed to the easy-to-peel state. Then, light was further irradiated for 210 seconds, but the state of the adhesive composition remained in the easy-to-peel state.

A similar test was performed with raising the temperature of the hot plate to 80° C. By irradiating light to the laminate for 3 seconds, the state of the adhesive composition changed to the PSA-like state. By further irradiating light for 30 seconds, the state of the adhesive composition changed to the easy-to-peel state. Then, light was further irradiated for 450 seconds, but the state of the adhesive composition remained in the easy-to-peel state.

A similar test was further performed with raising the temperature of the hot plate to 100° C. By irradiating light to the laminate for 2 seconds, the state of the adhesive composition changed to the PSA-like state. Then, light was further irradiated for 480 seconds, but the state of the adhesive composition remained in the easy-to-peel state.

Comparative Example 4

A half part of a photo-polymerization initiator (Irgacure819 from Ciba Japan K.K.) was added to 100 parts of dimethylaminoethyl methacrylate monomer (from Kyoeisha Chemical Co., Ltd.) and dissolved to prepare adhesive composition. To accelerate rate of dissolution, ultrasonic wave was applied while heating at 50° C. One milliliter of dimethylaminoethyl methacrylate monomer was dropped onto a plate glass, and a polarizing film (VEGQ5724DU from Nitto Denko Corporation) was overlapped thereon, and laminated with a hand roller. The plate glass laminated with the polarizing film was placed as the glass facing downward onto a hot plate (HHP-411 from As One Corporation) heated to 60° C., and light was irradiated from the polarizing film side with an ultraviolet irradiator (UBX0801-01 from Eye Graphics Co., Ltd., a high voltage mercury lamp with output of 8 kW). For preventing the temperature of the polarizing film or the plate glass overheated than necessary, a heat ray cut filter was mounted between the ultraviolet irradiator and the polarizing film. Light with irradiation intensity of 14 mW/cm$^2$ at wavelength of 405 nm was irradiated from the polarizing film side.

By irradiating light to the laminate of the polarizing film and the plate glass via the adhesive composition in fluid state for 120 to 240 seconds, the state of the adhesive composition changed to the PSA-like state. By raising the temperature of the hot plate to 80° C. and further irradiating light for 240 seconds, the state of the adhesive composition changed to the easy-to-peel state. But, even by irradiating light any further, the state of the adhesive composition remained in the easy-to-peel state.

A similar test was performed with raising the temperature of the hot plate to 80° C. By irradiating light to the laminate for 120 seconds, the state of the adhesive composition changed to the PSA-like state. By raising the temperature of the hot plate to 100° C. and further irradiating light for 120 seconds, the state of the adhesive composition changed to the easy-to-peel state. But, even by irradiating light any further, the state of the adhesive composition remained in the easy-to-peel state.

A polarizing film was peeled from a liquid crystal panel of a liquid crystal television (LC16E1 from Sharp Corporation) to prepare a liquid crystal cell. The liquid crystal cell was laminated with a polarizing film (VEGQ5724DU from Nitto Denko Corporation) with a hand roller. An instant adhesive (Aron Alpha® from Konishi Co., Ltd.) was used as an adhesive. When an instant adhesive is used as an adhesive, it is difficult to laminate a liquid crystal film on an entire surface thereof even when it is small such as a 16-inch cell because the adhesive instantaneously cures. The instant adhesive cured before it was spread so that the adhesive was not applied to some area. Also, since the polarizing film was instantaneously bonded with the liquid crystal cell, initial alignment was difficult, and, once laminated, it was not possible to peel the polarizing film from the liquid crystal cell. Thus, a process of laminating a polarizing film and a liquid crystal cell using such an adhesive is considered to reduce productivity because the polarizing film may not be peeled to allow for re-using the liquid crystal cell if air bubble or foreign item is trapped when laminating. It was not possible either to peel the polarizing film even after immersing in hot water as was in Example 18. It is disadvantageous because it is not possible to separate the polarizing film and the liquid crystal cell for recycling the liquid crystal cell.

The invention claimed is:

1. A method for manufacturing a laminate including at least two adherends and a layer of adhesive composition, the at least two adherends are laminated with the adhesive composition which develops adhesive strength by irradiating electromagnetic wave or particle beam,
    the adhesive composition comprising an adhesive base agent consisting of at least one type of monomer and at least one type of polymerization initiator, wherein (1) the at least one type of monomer is a monofunctional (meth)acryloyl group-containing monomer having at least one of hydroxyl group, carboxyl group, cyano group, amino group, alicyclic hydrocarbon group, heterocyclic group, isocyanate group, lactone ring group or amido group and glass transition temperature after polymerization of the adhesive base agent is 50° C. or higher, (2) the at least one type of monomer is acrylonitrile, or (3) the at least one type of monomer is 2-hydroxyethylacrylate, wherein the adhesive strength of the adhesive composition changes in accordance with an increase of an irradiation amount of the electromagnetic wave or particle beam irradiated to the adhesive composition under a predetermined temperature environment, such that the adhesive strength (i) increases to a first value when the irradiation amount reaches to a first predetermined amount, (ii) subsequently decreases from the first value to a second value when the irradiation amount increases to a second predetermined amount, and (iii) increases from the second value so that the adhesive strength becomes greater than the first value after the irradiation amount increases to more than a third predetermined amount, the first value being greater than the second value, the first predetermined amount being smaller than the second predetermined amount which is smaller than the third predetermined amount, the method comprising steps of:

irradiating the electromagnetic wave or particle beam to the adhesive composition to change a state of the adhesive composition to a viscoelastic state in which the adhesive strength increases by pressure, thereby temporarily bonding the at least two adherends via the adhesive composition in the viscoelastic state;

inspecting the temporarily bonded at least two adherends to determine whether correction of lamination is required;

when it is required as a result of the inspection to correct lamination of the temporarily bonded at least two adherends, further irradiating the electromagnetic wave or particle beam to the adhesive composition so that the adhesive strength becomes in a predetermined range where the adhesive strength is smaller than the first value and is equal to or more than the second value, such that it is possible to peel at least one of the at least two adherends and the layer of the adhesive composition at an interface therebetween; and when it is not required as a result of the inspection to correct lamination of the temporarily bonded at least two adherends, further irradiating the electromagnetic wave or particle beam to the adhesive composition such that the adhesive strength becomes more than the first value to fully bond the at least two adherends.

2. A method as defined by claim 1, wherein the at least one type of polymerization initiator is a photo-polymerization initiator.

3. A method as defined by claim 2, wherein electromagnetic wave absorption wavelength of the photo-polymerization initiator is a wavelength of electromagnetic wave which transmits through either one of the at least two adherends.

4. A method as defined by claim 1, wherein one of the at least two adherends is an optical film and the other of the at least two adherends is a substrate.

5. A method as defined by claim 4, wherein the optical film is a polarizing film, a polarizer, an anti-glare film, a hard-coat film, an anti-reflection film, an optical compensation film, a conductive film, a UV-cut film, a diffusion film, a prismatic film, a light distribution film, a heat ray cut film, a band cut filter or an electromagnetic wave shield film.

6. A method as defined by claim 1, wherein the adhesive composition comprises at least one type of monomer selected from hydroxymethyl acrylamide, hydroxyethyl acrylamide, hydroxypropyl acrylamide, dimethyl acrylamide, diethyl acrylamide, hydroxyethyl acrylate, glycidyl methacrylate, tetrahydrofurfuryl methacrylate, acryloylmorpholine, acrylic acid, acrylonitrile, N-methyl methacrylamide, dicyclopentenyl acrylate, 2-isocyanatoethyl acrylate, 2-isocyanatoethyl methacrylate, γ-butyrolactone acylate and γ-butyrolactone methacylate.

7. A method as defined by claim 1, wherein the step of temporarily bonding the at least two adherends comprises steps of:
    applying the adhesive composition to which the electromagnetic wave or particle beam is not yet irradiated to one of the at least two adherends;
    laminating the other of the at least two adherends on the adhesive composition; and
    irradiating the electromagnetic wave or particle beam to the adhesive composition to change the state of the adhesive composition to the viscoelastic state.

8. A method as defined by claim 1, wherein the step of temporarily bonding the at least two adherends comprises steps of:
    applying the adhesive composition to which the electromagnetic wave or particle beam is not yet irradiated to one of the at least two adherends;
    irradiating the electromagnetic wave or particle beam to the adhesive composition to change the state of the adhesive composition to the viscoelastic state; and
    laminating the other of the at least two adherends on the adhesive composition.

9. A method as defined by claim 1, wherein the step of temporarily bonding the at least two adherends comprises steps of:
    applying the adhesive composition to which the electromagnetic wave or particle beam is not yet irradiated to one of the at least two adherends;
    irradiating the electromagnetic wave or particle beam to the adhesive composition to change the state of the adhesive composition to a PSA-like state;
    laminating a releasable liner on the adhesive composition;
    peeling the releasable liner from the adhesive composition; and
    laminating the other of the at least two adherends on a surface of the adhesive composition which the releasable liner is peeled therefrom.

10. A method as defined by claim 1, wherein the step of temporarily bonding the at least two adherends comprises steps of:
    applying the adhesive composition to which the electromagnetic wave or particle beam is not yet irradiated to one of the at least two adherends;
    laminating a releasable liner on the adhesive composition;
    irradiating the electromagnetic wave or particle beam to the adhesive composition to change the state of the adhesive composition to a PSA-like state;
    peeling the releasable liner from the adhesive composition; and
    laminating the other of the at least two adherends on a surface of the adhesive composition which the releasable liner is peeled therefrom.

11. A method as defined by claim 1, wherein the step of temporarily bonding the at least two adherends comprises steps of:
    applying the adhesive composition to which the electromagnetic wave or particle beam is not yet irradiated to a releasable liner;
    laminating one of the at least two adherends on the adhesive composition;
    irradiating the electromagnetic wave or particle beam to the adhesive composition to change the state of the adhesive composition to the viscoelastic state;
    peeling the releasable liner from the adhesive composition; and
    laminating the other of the at least two adherends on a surface of the adhesive composition which the releasable liner is peeled therefrom.

12. A method as defined by claim 1, wherein the step of temporarily bonding the at least two adherends comprises steps of:
    applying the adhesive composition to which the electromagnetic wave or particle beam is not yet irradiated to a releasable liner;
    irradiating the electromagnetic wave or particle beam to the adhesive composition to change the state of the adhesive composition to the viscoelastic state;
    transferring the adhesive composition to one of the at least two adherends;
    peeling the releasable liner from the adhesive composition; and
    laminating the other of the at least two adherends on a surface of the adhesive composition which the releasable liner is peeled therefrom.

13. A method as defined by claim 1, wherein the step of temporarily bonding the at least two adherends comprises steps of:
    applying the adhesive composition to which the electromagnetic wave or particle beam is not yet irradiated to a releasable liner;
    laminating another releasable liner on the adhesive composition;
    irradiating the electromagnetic wave or particle beam to the adhesive composition to change the state of the adhesive composition to the viscoelastic state;
    peeling one of the releasable liner or the another releasable liner;
    transferring a surface of the adhesive composition which the one of the releasable liner or the another releasable liner is peeled therefrom to one of the at least two adherends;
    peeling the other of the releasable liner or the another releasable liner; and
    laminating the other of the at least two adherends on the other surface of the adhesive composition which the other of the releasable liner or the another releasable line is peeled therefrom.

14. A method as defined by claim 1, wherein the step of temporarily bonding the at least two adherends comprises steps of:
    applying the adhesive composition to which the electromagnetic wave or particle beam is not yet irradiated to a releasable liner;
    irradiating the electromagnetic wave or particle beam to the adhesive composition to change the state of the adhesive composition to the viscoelastic state;
    laminating another releasable liner on the adhesive composition;
    peeling one of the releasable liner or the another releasable liner;

transferring a surface of the adhesive composition which the one of the releasable liner or the another releasable liner is peeled therefrom to one of the at least two adherends;

peeling the other of the releasable liner or the another releasable liner; and laminating the other of the at least two adherends on the other surface of the adhesive composition which the other of the releasable liner or the another releasable line is peeled therefrom.

15. A method as defined by claim 1, wherein increase of irradiation intensity of electromagnetic wave or particle beam and/or rise of temperature for adhesion allows for shortening time required for the state of the adhesive composition changing to the viscoelastic state, time required for the adhesive composition curing to a degree where one of the adherends and a layer of the adhesive composition may be peeled at an interface therebetween without damaging the adherends and time required for fully bonding the at least two adherends.

16. A method as defined by claim 1,
wherein when it is not required as the result of the inspection to correct lamination of the temporarily bonded at least two adherends, further comprising a step of peeling the at least two adherends and the adhesive composition by immersing a laminate consisting of the at least two adherends and the adhesive composition in water.

17. A method as defined by claim 1, wherein one of the at least two adherends is an optical film and the other of the at least two adherends is a glass substrate or a plastic substrate.

18. A method as defined by claim 1, wherein both of the at least two adherends are optical films.

19. A method as defined by claim 1, wherein both of the at least two adherends are glass substrates or plastic substrates.

20. A method for manufacturing a laminate including at least two adherends and a layer of adhesive composition, the at least two adherends are laminated with the adhesive composition which develops adhesive strength by irradiating electromagnetic wave or particle beam, the adhesive composition comprising an adhesive base agent consisting of at least one type of monomer and at least one type of polymerization initiator, wherein (1) the at least one type of monomer is a monofunctional (meth)acryloyl group-containing monomer having at least one of hydroxyl group, carboxyl group, cyano group, amino group, alicyclic hydrocarbon group, heterocyclic group, isocyanate group, lactone ring group or amido group and glass transition temperature after polymerization of the adhesive base agent is 50° C. or higher, (2) the at least one type of monomer is acrylonitrile, or (3) the at least one type of monomer is 2-hydroxyethylacrylate, wherein the adhesive strength of the adhesive composition changes in accordance with an increase of an irradiation amount of the electromagnetic wave or particle beam irradiated to the adhesive composition under a predetermined temperature environment, such that the adhesive strength (i) increases to a first value when the irradiation amount reaches to a first predetermined amount, (ii) subsequently decreases from the first value to a second value when the irradiation amount increases to a second predetermined amount, and (iii) increases from the second value so that the adhesive strength becomes greater than the first value after the irradiation amount increases to more than a third predetermined amount, the first value being greater than the second value, the first predetermined amount being smaller than the second predetermined amount which is smaller than the third predetermined amount, the method comprising steps of:

irradiating the electromagnetic wave or particle beam to the adhesive composition to change a state of the adhesive composition to a viscoelastic state in which the adhesive strength increases by pressure, thereby temporarily bonding the at least two adherends via the adhesive composition in the viscoelastic state;

further irradiating the electromagnetic wave or particle beam to the adhesive composition so that the adhesive strength becomes in a predetermined range where the adhesive strength is smaller than the first value and is equal to or more than the second value, and inspecting the temporarily bonded at least two adherends to determine whether correction of lamination is required;

when it is required as a result of the inspection to correct lamination of the temporarily bonded at least two adherends, peeling at least one of the at least two adherends and the layer of the adhesive composition at an interface therebetween; and when it is not required as a result of the inspection to correct lamination of the temporarily bonded at least two adherends, further irradiating the electromagnetic wave or particle beam to the adhesive composition such that the adhesive strength becomes more than the first value to fully bond the at least two adherends.

21. A method for manufacturing a laminate including at least two adherends and a layer of adhesive composition, the at least two adherends are laminated with the adhesive composition which develops adhesive strength by irradiating electromagnetic wave or particle beam, wherein the adhesive composition comprising: an adhesive base agent consisting of at least one type of monomer and at least one type of polymerization initiator, wherein (1) the at least one type of monomer is a monofunctional (meth)acryloyl group-containing monomer having at least one of hydroxyl group, carboxyl group, cyano group, amino group, alicyclic hydrocarbon group, heterocyclic group or amido group and glass transition temperature after polymerization of the adhesive base agent is 50° C. or higher, (2) the at least one type of monomer is acrylonitrile, or (3) the at least one type of monomer is 2-hydroxyethylacrylate, and wherein the adhesive strength of the adhesive composition changes in accordance with an increase of an irradiation amount of the electromagnetic wave or particle beam irradiated to the adhesive composition under a predetermined temperature environment, such that the adhesive strength (i) increases to a first value when the irradiation amount reaches to a first predetermined amount, (ii) subsequently decreases from the first value to a second value when the irradiation amount increases to a second predetermined amount and (iii) increases from the second value so that the adhesive strength becomes greater than the first value after the irradiation amount increases to more than a third predetermined amount, the first value being greater than the second value, the first predetermined amount being smaller than the second predetermined amount which is smaller than the third predetermined amount, the method comprising steps of:

irradiating the electromagnetic wave or particle beam to the adhesive composition to change a state of the adhesive composition to a viscoelastic state in which the adhesive strength increases by pressure, thereby temporarily bonding the at least two adherends via the adhesive composition in the viscoelastic state;

inspecting the temporarily bonded at least two adherends to determine whether correction of lamination is required;

when it is required as a result of the inspection to correct lamination of the temporarily bonded at least two adherends, further irradiating the electromagnetic wave or particle beam to the adhesive composition so that the adhesive strength becomes in a predetermined range where the adhesive strength is smaller than the first value and is equal to or more than the second value, such that it is possible to peel at least one of the at least two adherends and the layer of the adhesive composition at an interface therebetween; and when it is not required as a result of the inspection to correct lamination of the temporarily bonded at least two adherends, maintaining the temporarily bonded at least two adherends and the adhesive composition in a temperature environment where the temperature thereof is higher than that of the predetermined temperature environment, so that the adhesive strength becomes more than the first value thereby fully bonding the at least two adherends.

* * * * *